US012749794B2

(12) United States Patent
Pattison et al.

(10) Patent No.: US 12,749,794 B2
(45) Date of Patent: Sep. 29, 2026

(54) SURVEY POLE WITH INTEGRATED ANTENNA

(71) Applicant: RTR Technologies, Inc, Loveland, CO (US)

(72) Inventors: Thomas Pattison, Kamuela, HI (US); Chris Pifer, Loveland, CO (US)

(73) Assignee: RTR Technologies, Inc., Loveland, CO (US)

( * ) Notice: Subject to any disclaimer, the term of this patent is extended or adjusted under 35 U.S.C. 154(b) by 209 days.

(21) Appl. No.: 18/659,941

(22) Filed: May 9, 2024

(65) Prior Publication Data

US 2025/0350017 A1 Nov. 13, 2025

(51) Int. Cl.
*H01Q 1/22* (2006.01)
*G01C 15/06* (2006.01)
*H01Q 1/50* (2006.01)

(52) U.S. Cl.
CPC ............... *H01Q 1/22* (2013.01); *G01C 15/06* (2013.01); *H01Q 1/50* (2013.01)

(58) Field of Classification Search
CPC ............. H01Q 1/22; H01Q 1/50; G01C 15/06
USPC ....................................................... 342/357.2
See application file for complete search history.

(56) References Cited

U.S. PATENT DOCUMENTS

2020/0333468 A1* 10/2020 Liu ......................... G01S 19/14

FOREIGN PATENT DOCUMENTS

WO WO-2008148530 A1 * 12/2008 ............. G01S 19/36

* cited by examiner

*Primary Examiner* — Harry K Liu
(74) *Attorney, Agent, or Firm* — Duft & Bornsen, PC

(57) ABSTRACT

Survey pole assembly and associated methods. In an embodiment, a survey pole assembly comprises a pole adapter configured to attach to a top end of a survey pole, and an antenna integrated in the survey pole. The pole adapter comprises a top male mount configured to mechanically couple to a survey instrument, and an antenna link comprising an upper Radio Frequency (RF) connector electrically coupled to a lower RF connector. The upper RF connector is configured to electrically connect to a corresponding RF connector of the survey instrument, and the lower RF connector is configured to electrically connect to the antenna integrated in the survey pole.

20 Claims, 28 Drawing Sheets

SURVEY POLE WITH INTEGRATED ANTENNA

FIELD

This disclosure relates to the field of survey equipment, and in particular, to survey equipment using satellite-based instruments.

BACKGROUND

Survey equipment is used to make precise measurements of the Earth's surface. One type of survey equipment is a satellite-based instrument (e.g., Global Navigation Satellite System (GNSS) or Global Positioning System (GPS)) that uses signals from satellites to determine location information. Satellite-based instruments include a satellite receiver (e.g., GNSS or GPS antenna) that receives radio signals broadcast from satellites in satellite frequency bands, such as 1575.42 MHz (L1) and 1227.60 MHz (L2). Satellite-based instruments may also include a land-based or terrestrial communication unit for communication with terrestrial devices over lower frequencies (e.g., sub-GHz) than the satellite frequency bands. For example, a satellite-based instrument may communicate with a terrestrial device over the Ultra High Frequency (UHF) band to receive correction data used to correct the location information determined from the satellite signals.

In surveying, a satellite-based instrument is commonly mounted on a survey pole to take measurements at one or more points. The satellite-based instrument and survey pole may be used as a mobile or rover unit that is carried or moved to multiple locations when performing measurements. One issue is when the antenna of the terrestrial communication unit is external to the satellite-based instrument (e.g., a whip antenna), the antenna can be damaged especially when the mobile unit is being moved between locations.

SUMMARY

Embodiments described herein provide a survey pole assembly configured for mounting a survey instrument (e.g., a satellite-based instrument) on a survey pole. The survey pole assembly comprises a pole adapter that attaches to the survey pole, and the pole adapter mechanically couples the survey instrument to the survey pole, and also electrically couples the survey instrument to an antenna that is integrated in the survey pole. For example, the antenna may be mounted within a hollow portion of the survey pole. One technical benefit is the antenna is less likely to be damaged when integrated in the survey pole.

In an embodiment, a survey pole assembly comprises a pole adapter configured to attach to a top end of a survey pole, and an antenna integrated in the survey pole. The pole adapter comprises a top male mount configured to mechanically couple to a survey instrument, and an antenna link comprising an upper Radio Frequency (RF) connector electrically coupled to a lower RF connector. The upper RF connector is configured to electrically connect to a corresponding RF connector of the survey instrument, and the lower RF connector is configured to electrically connect to the antenna integrated in the survey pole.

In an embodiment, a survey pole assembly comprises a pole adapter configured to attach to a top end of a survey pole, and an antenna. The pole adapter comprises a top male mount configured to mechanically couple to a survey instrument, a bottom antenna mount configured to hold the antenna within a hollow portion of the survey pole, and an antenna link comprising an upper RF connector electrically coupled to a lower RF connector. The upper RF connector is configured to electrically connect to a corresponding RF connector of the survey instrument, and the lower RF connector is configured to electrically connect to the antenna.

In an embodiment, a method of assembling survey equipment is disclosed. The method comprises acquiring a survey pole, a pole adapter, and an antenna, where the pole adapter comprises a top male mount configured to mechanically couple to a survey instrument, and an antenna link comprising an upper RF connector electrically coupled to a lower RF connector. The method further comprises electrically coupling the antenna to the lower RF connector of the pole adapter, and attaching the pole adapter to a top end of the survey pole, where the antenna is integrated in the survey pole. The method further comprises mechanically mounting the survey instrument to the top male mount of the pole adapter, and electrically coupling the upper RF connector of the pole adapter to a corresponding RF connector of the survey instrument.

In an embodiment, a survey instrument comprises a housing configured to house a satellite antenna, a satellite receiver, and an RF transceiver or RF transmitter. A base of the housing comprises a female mount, and an RF connector embedded in the female mount.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
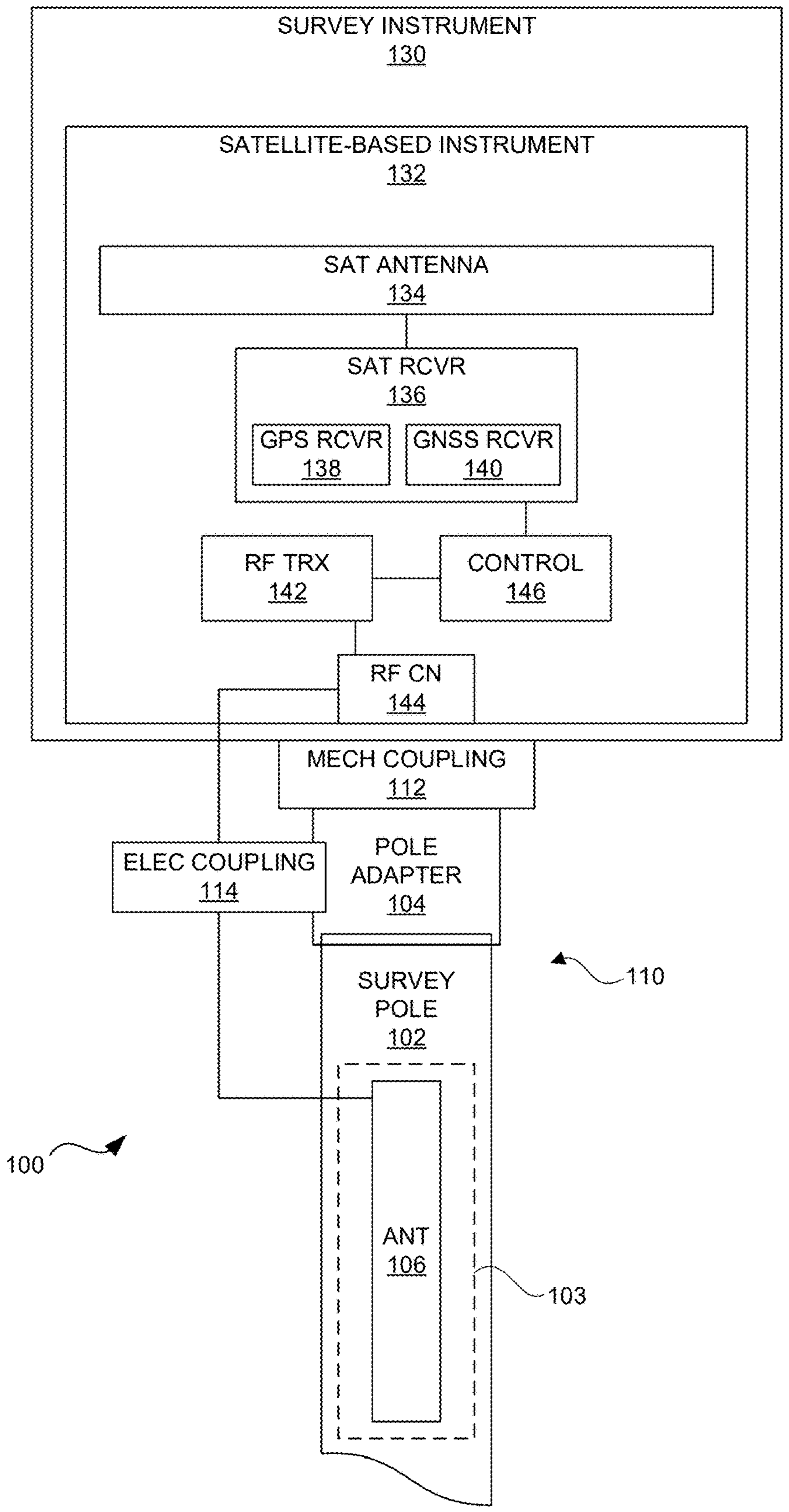
FIG. 1 is a schematic diagram of a survey pole assembly in an illustrative embodiment.

FIG. 1 is a schematic diagram of a survey pole assembly 100 in an illustrative embodiment. In an embodiment, survey pole assembly 100 may comprise a survey pole 102, a pole adapter 104, and an antenna 106. Survey pole 102 is a hollow rod or shaft upon which a survey instrument 130 may be mounted. Survey pole 102 may be made from a variety of rigid materials, such as fiberglass, plastic, etc. Survey pole 102 may have a predefined or fixed length (e.g., 1.5 meters (m), 2 m, etc.), or may have a variable or adjustable length (e.g., a telescoping pole). Survey pole 102 may represent an entire or complete survey pole (e.g., 1.8 m, 2 m, 2.2 m, etc.), a segment of a survey pole, an extension to a survey pole, etc.

Pole adapter 104 is a structural element or apparatus configured to mechanically interface or couple a survey instrument 130 with the survey pole 102, and electrically interface or couple the survey instrument 130 with the antenna 106. Pole adapter 104 is configured to engage with or couple to survey pole 102 at or proximate to an upper or top end 110 of survey pole 102. It is noted that because a survey pole 102 is operated in a generally-upright orientation, certain elements may be described with terms related to “upper”, “lower”, “top”, “bottom”, etc., but these terms may be replaced with “first”, “second”, etc. Pole adapter 104 comprises or provides a mechanical coupling 112 configured to mechanically couple or connect to the survey instrument 130, and an electrical coupling 114 configured to electrically couple or connect the survey instrument 130 to antenna 106. Pole adapter 104 therefore sits in-line between the survey pole 102 and the survey instrument 130.

Antenna 106 comprises a device or apparatus configured to transmit and/or receive Radio Frequency (RF) signals. Antenna 106 may be referred to as a land-based or terrestrial antenna configured for communication with terrestrial devices over sub-GHz frequency bands. For example, antenna 106 may be configured for communication over the Ultra High Frequency (UHF) band, such as frequencies between 420 MHz and 450 MHz (i.e., the 70 centimeter (cm) band), frequencies between 902 MHz and 928 MHz (i.e., the 23 cm band), and/or other frequencies. Antenna 106 may comprise a monopole antenna, such as a whip antenna comprising a straight, flexible wire or rod. Although one antenna 106 is illustrated in FIG. 1, survey pole assembly 100 may comprise multiple antennas 106.

In embodiments described herein, antenna 106 is integrated in survey pole 102. For example, antenna 106 may be mounted or disposed within a hollow portion 103 of survey pole 102. In another example, antenna 106 may form part of the body of survey pole 102. Thus, antenna 106 and survey pole 102 may comprise a monolithic or unitary body where a portion of the material used to form survey pole 102 also forms antenna 106. For instance, at least a portion of the material that forms survey pole 102 may comprise a metal or conductive material that defines antenna 106, while the remainder of the survey pole 102 is made from a non-conductive material.

In an embodiment, survey instrument 130 may comprise a satellite-based instrument 132 configured to perform measurements (e.g., location measurements) based on radio signals received from satellites. Satellite-based instrument 132 comprises a satellite antenna 134 configured to receive radio signals from satellites, and a satellite receiver 136 configured to process the radio signals to calculate location information and other information. For example, satellite receiver 136 may comprise a GPS receiver 138, a GNSS receiver 140, or another type of receiver. Satellite-based instrument 132 is further configured for terrestrial communications. Thus, satellite-based instrument 132 includes an RF transceiver 142 (TRX) and an RF connector 144 (CN). RF transceiver 142 is a device that transmits and receives RF signals, and RF connector 144 is an electrical connector designed to work in the RF range and to connect RF transceiver 142 to an antenna. RF transceiver 142 is configured to operate at lower frequencies than satellite receiver 136 (e.g., sub-GHz). For example, RF transceiver 142 may be configured to operate in the UHF band, such as frequencies between 420 MHz and 450 MHZ, frequencies between 902 MHz and 928 MHZ, and/or other frequencies. Although an RF transceiver 142 is shown, satellite-based instrument 132 may include a separate RF transmitter and/or RF receiver as desired. Satellite-based instrument 132 further includes an on-board controller 146 configured to process information/data from satellite receiver 136 and/or RF transceiver 142 to perform location measurements. For example, controller 146 may receive correction data through RF transceiver 142 to correct information received via satellite receiver 136 when performing the location measurements. Controller 146 is configured to output the location measurements (i.e., GPS coordinate, GNSS coordinates, etc.) for points being measured.

Figure 2:
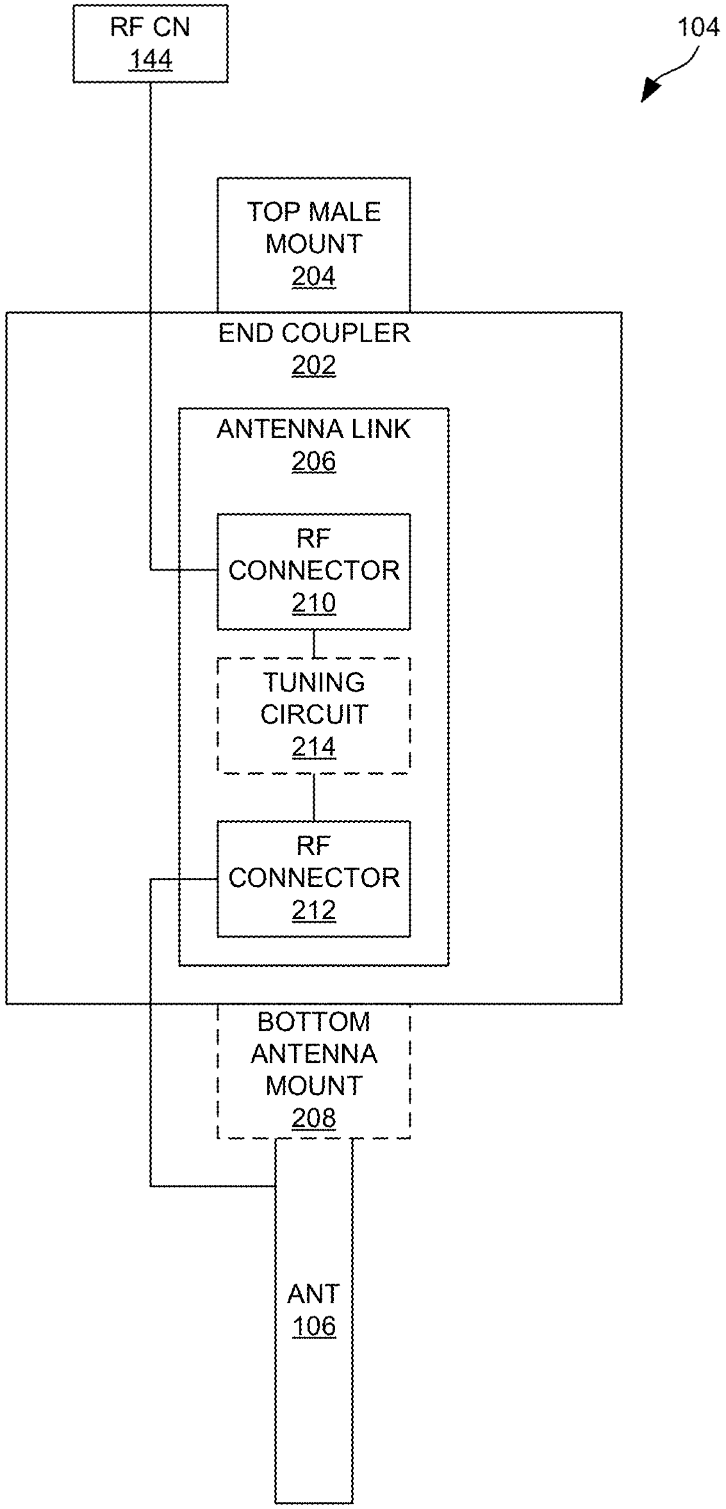
FIG. 2 is a schematic view of a pole adapter in an illustrative embodiment.

FIG. 2 is a schematic view of pole adapter 104 in an illustrative embodiment. In an embodiment, pole adapter 104 comprises an end coupler 202 configured to engage with or couple to the top end 110 of a survey pole 102. Pole adapter 104 further comprises a top male mount 204 that forms the mechanical coupling 112. Top male mount 204 is a physical or mechanical mount configured for mounting a survey instrument 130. For example, a base for a survey instrument 130 may comprise a standard female mount, which is a ⅝-inch threaded hole with 11 Threads Per Inch (TPI). Thus, top male mount 204 may comprise a ⅝-inch threaded rod with 11 TPI, however other types of mounts are considered herein. Pole adapter 104 further comprises an antenna link 206 that forms the electrical coupling 114. Antenna link 206 is an electrical connection structure or transmission line configured to electrically connect antenna 106 with a survey instrument 130. Antenna link 206 comprises an upper RF connector 210 electrically connected to a lower RF connector 212. Upper RF connector 210 is configured to mate with or couple to a corresponding RF connector 144 (e.g., an SMA (SubMiniature version A) female connector, an SMB (SubMiniature version B) female connector, etc.) of a survey instrument 130. Lower RF connector 212 is configured to mate with or couple to antenna 106 (e.g., a corresponding RF connector of antenna 106). In an embodiment, antenna link 206 may further comprise an antenna tuning circuit 214, which is a passive electronic device disposed between antenna 106 and an RF transceiver (e.g., RF transceiver 142), and configured to optimize power transfer by substantially matching the impedance of the antenna 106 and the RF transceiver.

In an embodiment, pole adapter 104 may further comprise a bottom antenna mount 208, which is a physical or mechanical mount configured for mounting the antenna 106. In an example, bottom antenna mount 208 may be configured to hold or support antenna 106 within the hollow portion 103 of survey pole 102. As will be described in further detail below, bottom antenna mount 208 may be provided by lower RF connector 212. However, other or additional mounting structures may be provided for mounting the antenna 106.

The following figures provide examples of the pole adapter 104 and/or survey pole 102.

Figure 3:
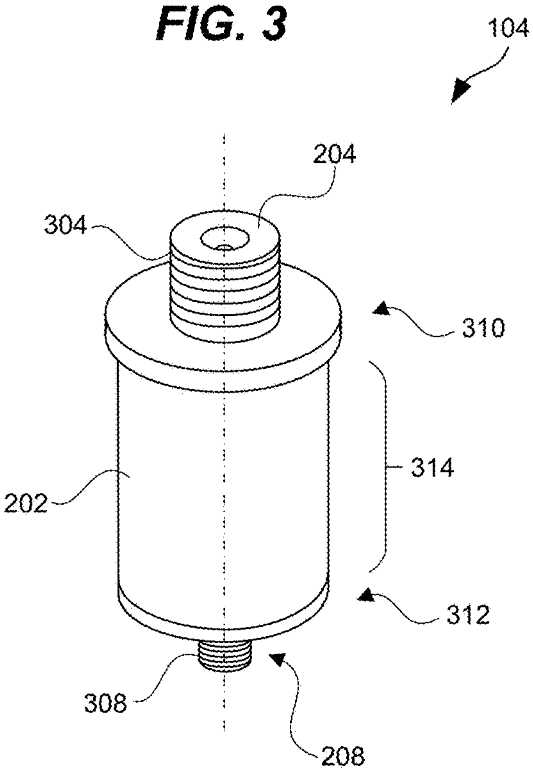
FIG. 3 is a perspective view of a pole adapter in an illustrative embodiment.
Figure 4:
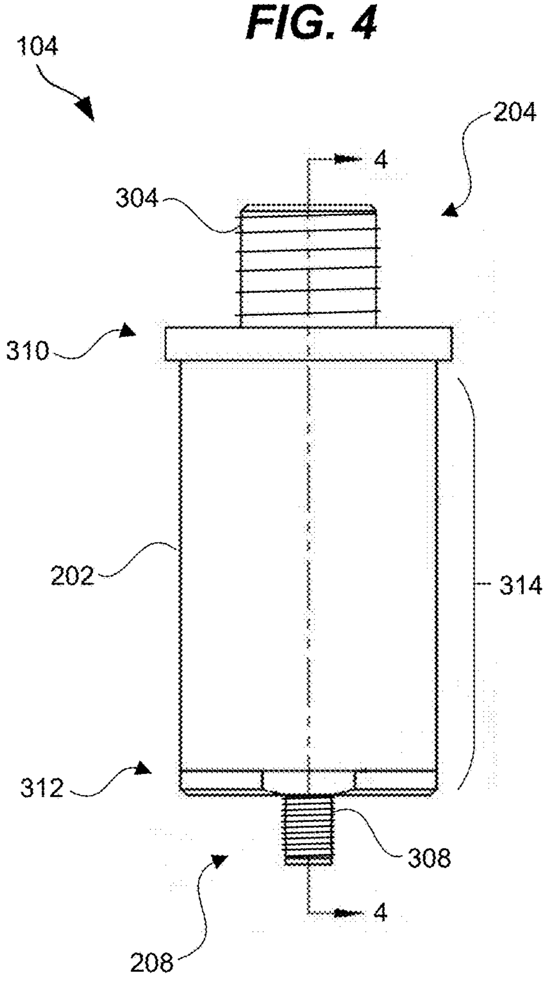
FIG. 4 is a side view of a pole adapter in an illustrative embodiment.

FIG. 3 is a perspective view of a pole adapter 104, and FIG. 4 is a side view of pole adapter 104 in an illustrative embodiment. FIGS. 3-4 are not drawn to scale. Pole adapter 104 comprises end coupler 202, which is generally a cylindrical member having a top male mount 204 disposed at a top end 310, and a bottom antenna mount 208 disposed at a bottom end 312. In an embodiment, top male mount 204 may comprise a threaded rod 304 (e.g., ⅝-inch 11 TPI) that projects axially from end coupler 202. In an embodiment, bottom antenna mount 208 may comprise a threaded end 308 of lower RF connector 212 that projects axially from end coupler 202. As shown in FIG. 3, top male mount 204 and bottom antenna mount 208 may be coaxial.

Figure 5:
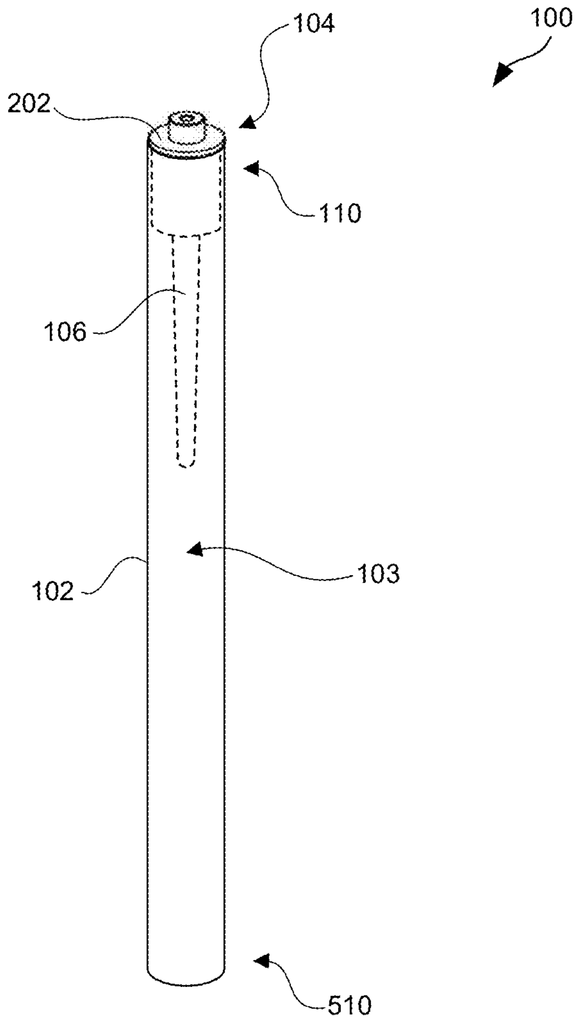
FIG. 5 is a perspective view of a survey pole assembly when assembled in an illustrative embodiment.

In an embodiment, at least a portion 314 of end coupler 202 is dimensioned to fit within a hollow portion 103 of survey pole 102. FIG. 5 is a perspective view of survey pole assembly 100 when assembled in an illustrative embodiment. FIG. 5 is not drawn to scale. In FIG. 5, pole adapter 104 is attached, fastened, or otherwise connected to survey pole 102. More particularly, end coupler 202 may be pressed or fitted into the top end 110 of survey pole 102 to secure pole adapter 104 to survey pole 102. Also shown is antenna 106 connected to bottom antenna mount 208 so that antenna 106 is disposed within the hollow portion 103 of survey pole 102. When connected in this fashion, antenna 106 is disposed upside down within the hollow portion 103 of survey pole 102.

Although not shown, a variety of structures may be attached to the bottom end 510 of survey pole 102 as desired. For example, a pointed tip, a wheel, a tripod, etc., may be attached to the bottom end 510 of survey pole 102.

Figure 6:
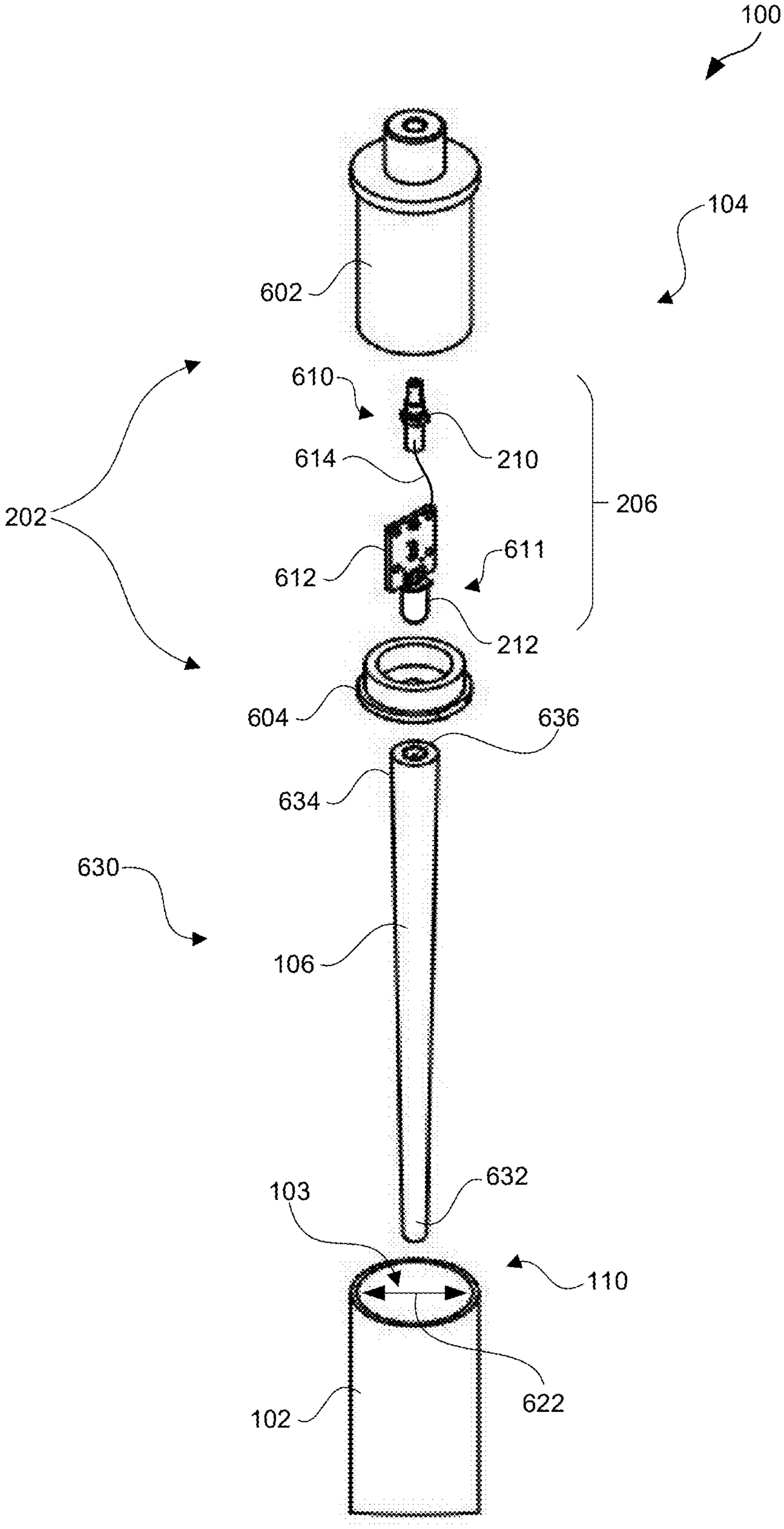
FIG. 6 is an exploded, perspective view of a survey pole assembly in an illustrative embodiment.

FIG. 6 is an exploded, perspective view of survey pole assembly 100 in an illustrative embodiment. FIG. 6 is not drawn to scale. As described above, survey pole assembly 100 may comprise survey pole 102, pole adapter 104, and antenna 106. In this embodiment, end coupler 202 of pole adapter 104 may be a multipart structure comprising an upper coupler member 602 and a lower coupler member 604. Pole adapter 104 comprises an antenna link 206 including an upper RF connector 210 electrically connected to a lower RF connector 212. For example, upper RF connector 210 may comprise an SMB male connector 610 (50Ω). Lower RF connector 212 may comprise an SMA female connector 611 (50Ω). Antenna link 206 may further comprise an internal print circuit board (PCB) 612 fabricated with an antenna tuning circuit 214 (see FIG. 2), which is disposed between the upper RF connector 210 and the lower RF connector 212. Antenna link 206 may further include an RF cable 614 (e.g., 50Ω) that electrically connects upper RF connector 210 and PCB 612.

In an embodiment, antenna 106 may comprise an elongated rod (e.g., a whip antenna 630) having a tip 632 opposite a base end 634. The base end 634 of antenna 106 includes a RF connector 636 configured to electrically couple to lower RF connector 212 of pole adapter 104. For example, RF connector 636 of antenna 106 may comprise an SMA male connector (50Ω).

Survey pole 102 has a hollow, cylindrical shape at top end 110. Therefore, the inside of survey pole 102 includes a cylindrical hollow portion 103 having an inner diameter 622 in the range of about 29-30 millimeters (mm). At least a portion of end coupler 202 may be insertable into the hollow portion 103 of survey pole 102 through top end 110.

Figure 7:
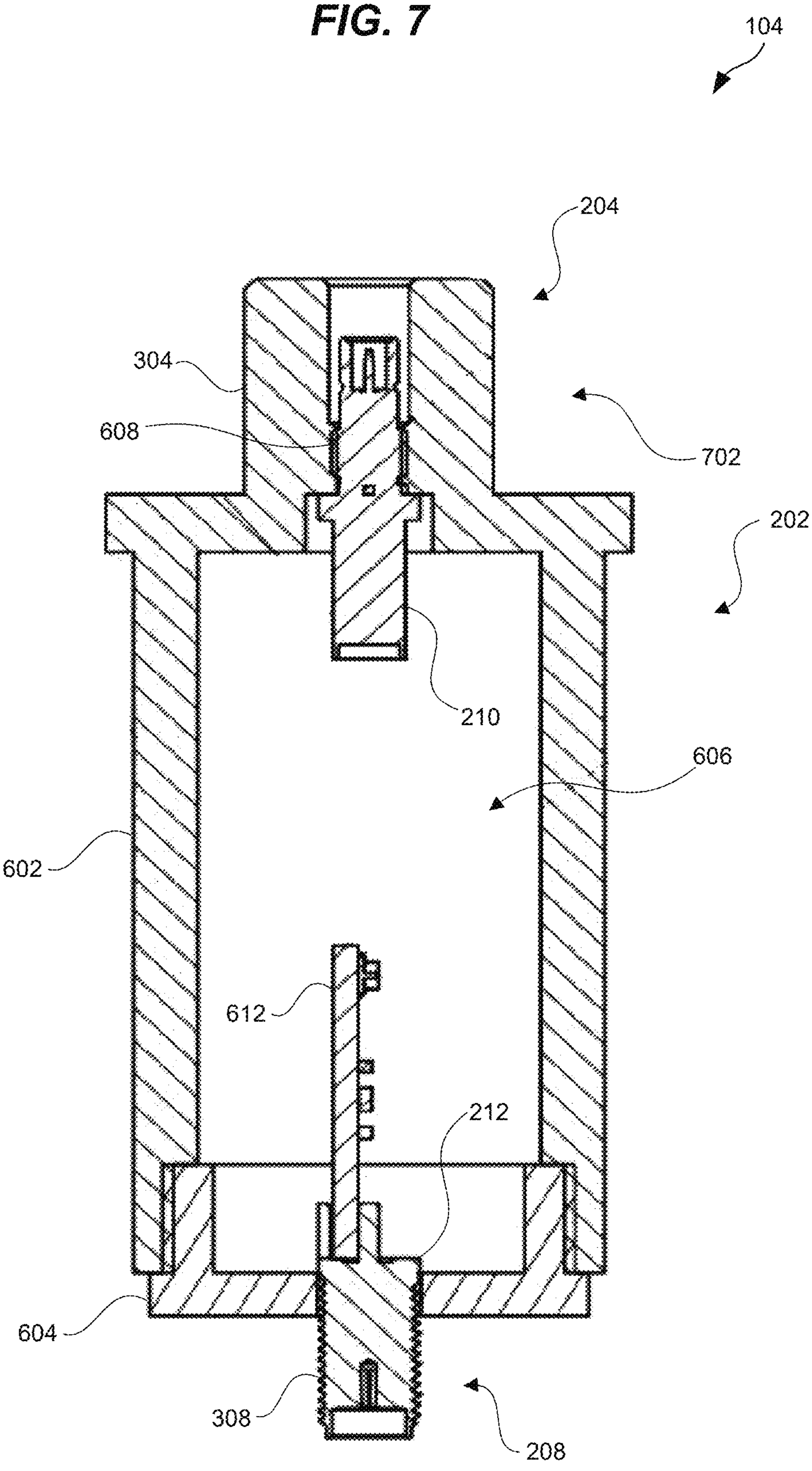
FIG. 7 is a cross-sectional view of a pole adapter in an illustrative embodiment.

FIG. 7 is a cross-sectional view of a pole adapter 104 in an illustrative embodiment. The view in FIG. 7 is along cut plane 4-4 in FIG. 4. FIG. 7 is not drawn to scale. When assembled, lower coupler member 604 attaches to a bottom end of upper coupler member 602 to form end coupler 202. For example, lower coupler member 604 may be dimensioned to have a press fit, an interference fit, etc., with the bottom end of upper coupler member 602. However, lower coupler member 604 may be attached to upper coupler member 602 in other ways, such as ribs, adhesive, etc. PCB 612 is disposed within an interior, cavity, or empty space 606 of end coupler 202. Upper RF connector 210 is attached to upper coupler member 602. For example, there may be a threaded connection 608 between upper RF connector 210 and upper coupler member 602. However, upper RF connector 210 may be attached to upper coupler member 602 in other ways, such as with a nut. With this attachment, top male mount 204 and upper RF connector 210 of pole adapter 104 comprise a combined RF/mechanical coupling 702. In other words, upper RF connector 210 is disposed within or is internal to top male mount 204. Thus, when a survey instrument 130 is physically mounted on top male mount 204, an RF connector 144 of the survey instrument 130 makes electrical contact with upper RF connector 210 in top male mount 204. Lower RF connector 212 is attached to lower coupler member 604. As will be described in more detail below, lower RF connector 212 may be inserted through a hole in lower coupler member 604, and attached thereto by a threaded connection, a nut, etc. When attached, threaded end 308 of lower RF connector 212 projects axially from lower coupler member 604 to define bottom antenna mount 208.

Figure 8:
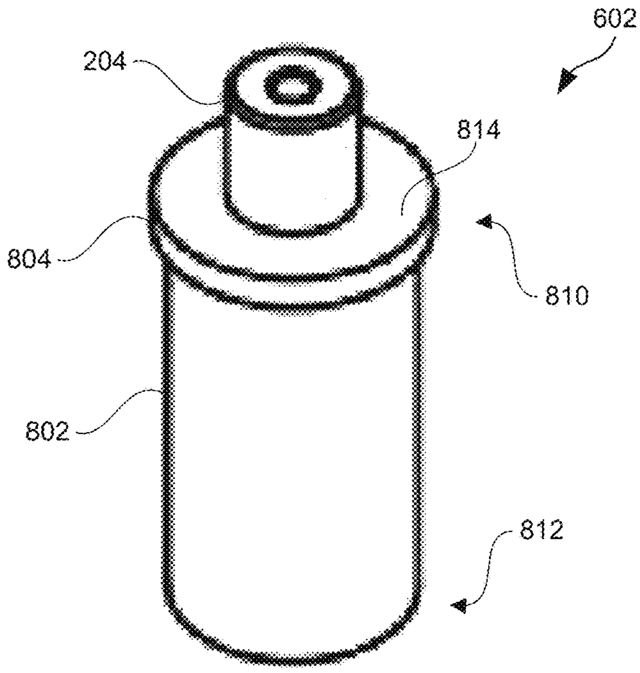
FIGS. 8-9 are perspective views of an upper coupler member in an illustrative embodiment.
Figure 9:
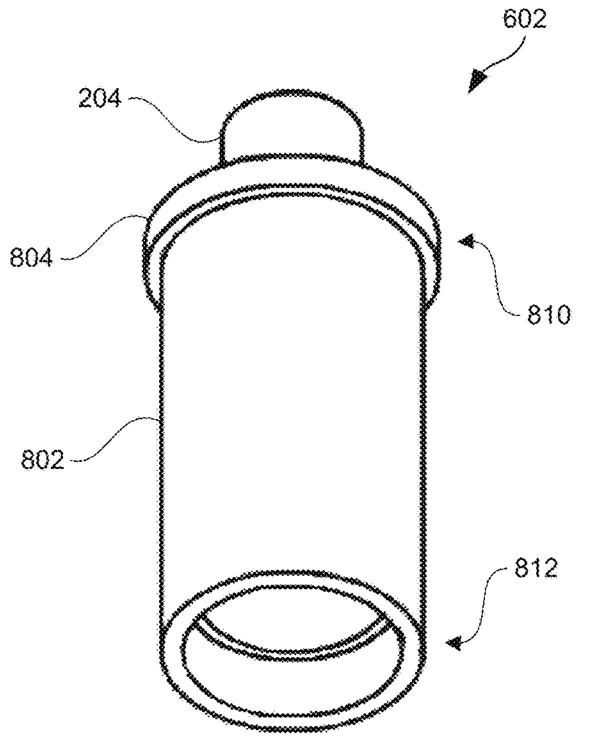

FIGS. 8-9 are perspective views of upper coupler member 602 in an illustrative embodiment. FIGS. 8-9 are not drawn to scale. Upper coupler member 602 comprises a cylindrical body 802, a flange 804, and top male mount 204. Cylindrical body 802 is a hollow cylinder having a top end 810, and an opposing bottom end 812. Cylindrical body 802 is hollow with an end wall 814 disposed at top end 810, and open at bottom end 812. Flange 804 is disposed at or toward top end 810 of cylindrical body 802. Cylindrical body 802 is dimensioned to fit within a hollow portion 103 of survey pole 102. Flange 804 projects radially outward from cylindrical body 802 to abut the top end 110 of survey pole 102 and control how far end coupler 202 may be pressed or inserted into survey pole 102. Top male mount 204 projects axially from end wall 814 of cylindrical body 802.

Figure 10:
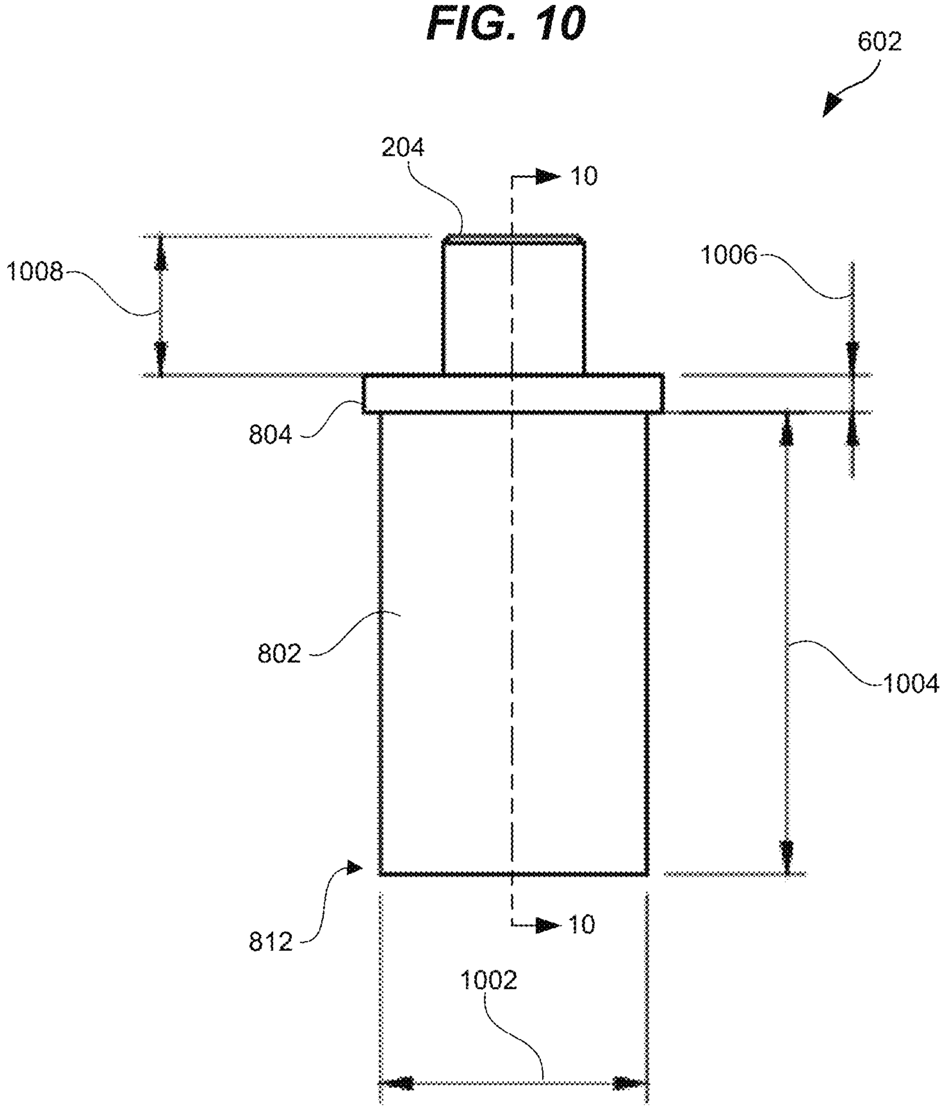
FIG. 10 is a side view of an upper coupler member in an illustrative embodiment.

FIG. 10 is a side view of upper coupler member 602 in an illustrative embodiment. FIG. 10 shows dimensions of upper coupler member 602 in an example, and other dimensions are considered herein. FIG. 10 is not drawn to scale. The length 1004 of cylindrical body 802 in the axial direction from bottom end 812 to flange 804 may be in the range of about 4-6 cm. The length 1006 or thickness of flange 804 in the axial direction may be in the range of about 3-5 mm. The length 1008 of top male mount 204 in the axial direction may be in the range of about 12-18 mm. Cylindrical body 802 has an outer diameter 1002 that corresponds with the inner diameter 622 of survey pole 102 (i.e., less than, equal to, or slightly larger). For example, outer diameter 1002 of cylindrical body 802 may be in the range of about 29-30 mm. The dimensional relationship between the outer diameter 1002 of cylindrical body 802 and the inner diameter 622 of survey pole 102 may define different types of fit. In an embodiment, the dimensional relationship may define a press fit, an interference fit, etc. In an embodiment, the dimensional relationship may define a clearance fit, and a fastener, adhesive, etc., may be used to attach upper coupler member 602 to survey pole 102.

Figure 11:
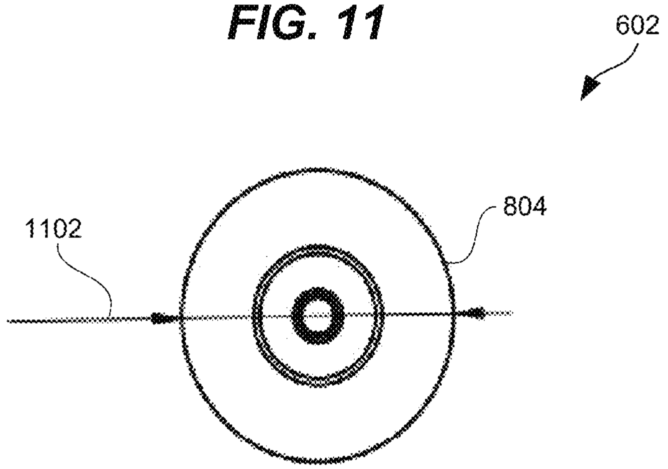
FIG. 11 is a top view of an upper coupler member in an illustrative embodiment.

FIG. 11 is a top view of upper coupler member 602 in an illustrative embodiment. FIG. 11 shows dimensions of upper coupler member 602 in an example, and other dimensions are considered herein. FIG. 11 is not drawn to scale. Flange 804 has an outer diameter 1102 greater than the inner diameter 622 of survey pole 102. For example, outer diameter 1102 of flange 804 may be in the range of about 32-34 mm.

Figure 12:
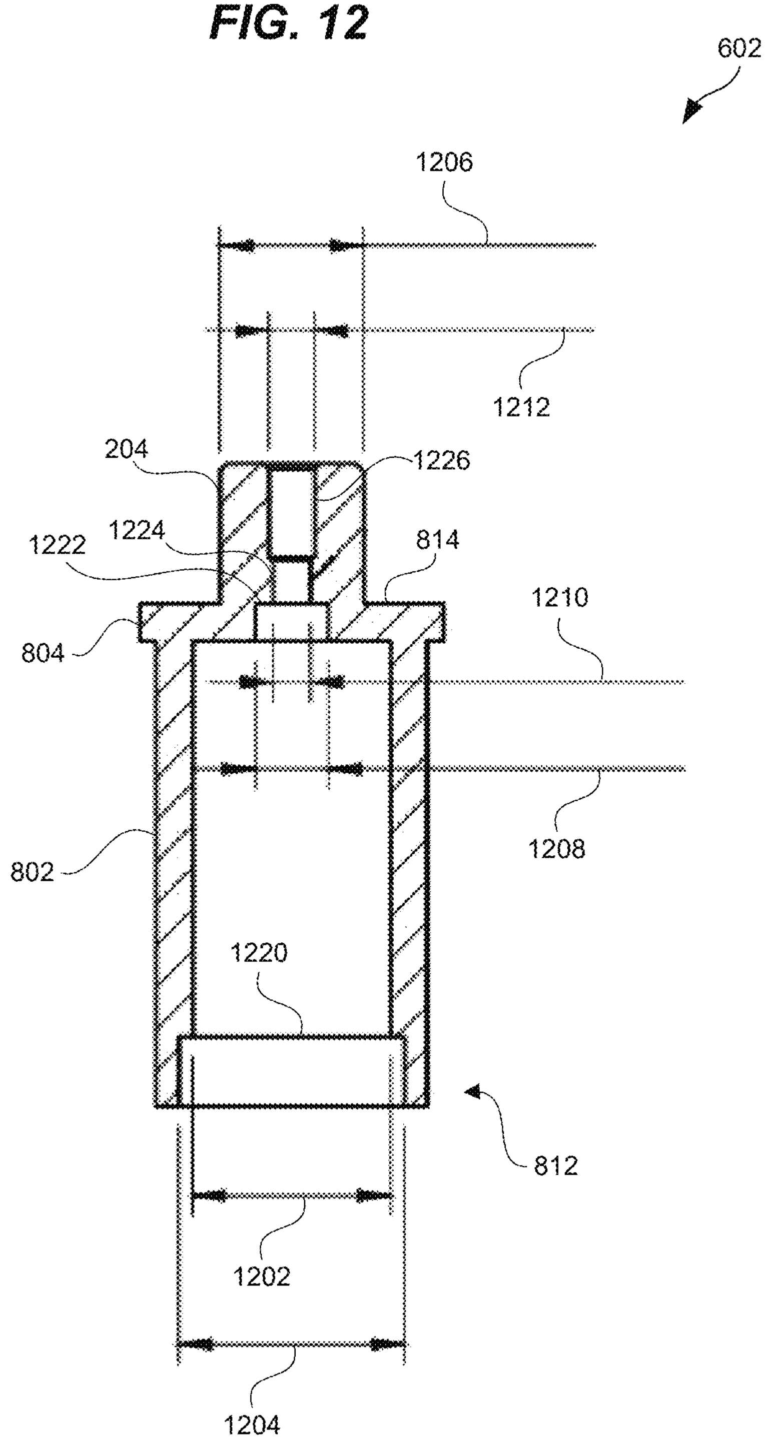
FIG. 12 is a cross-sectional view of an upper coupler member in an illustrative embodiment.

FIG. 12 is a cross-sectional view of upper coupler member 602 in an illustrative embodiment. The view in FIG. 12 is along cut plane 10-10 in FIG. 10. FIG. 12 shows dimensions of upper coupler member 602 in an example, and other dimensions are considered herein. FIG. 12 is not drawn to scale. The cylindrical body 802 of upper coupler member 602 is a hollow cylinder having an inner diameter 1202, which may be in the range of about 21-22 mm. The bottom end 812 of cylindrical body 802 is open, and includes a circular groove 1220 centered on the axis of cylindrical body 802 that forms or defines a seat for lower coupler member 604. The inner diameter 1204 of circular groove 1220 may be in the range of about 24-25 mm. Upper coupler member 602 further includes a series of cylindrical bores or holes, centered on the axis of cylindrical body 802 in the axial direction, and disposed through end wall 814 and top male mount 204 to accommodate upper RF connector 210. A first cylindrical hole 1222 is disposed through end wall 814 of cylindrical body 802, and may have an inner diameter 1208 in the range of about 7.5-8.5 mm. A second cylindrical hole 1224 adjoining the first cylindrical hole 1222 is disposed through top male mount 204, and a third cylindrical hole 1226 adjoining the second cylindrical hole 1224 is also disposed through top male mount 204. Second cylindrical hole 1224 may comprise a threaded hole (e.g., 10-32 UNF (unified fine)) having an inner diameter 1210 in the range of about 4.0-4.1 mm. Second cylindrical hole 1224 may therefore form a threaded connection 608 with upper RF connector 210 (e.g., a front-side nut style SMB connector). Third cylindrical hole 1226 may have an inner diameter 1212 in the range of about 4.5-5.5 mm. Top male mount 204 may have an outer diameter 1206 of about ⅝ inch.

Figure 13:
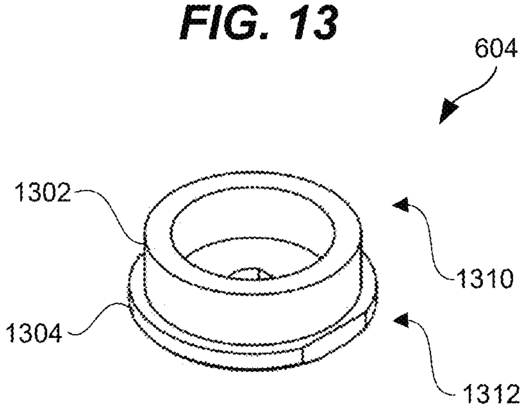
FIGS. 13-14 are perspective views of a lower coupler member in an illustrative embodiment.
Figure 14:
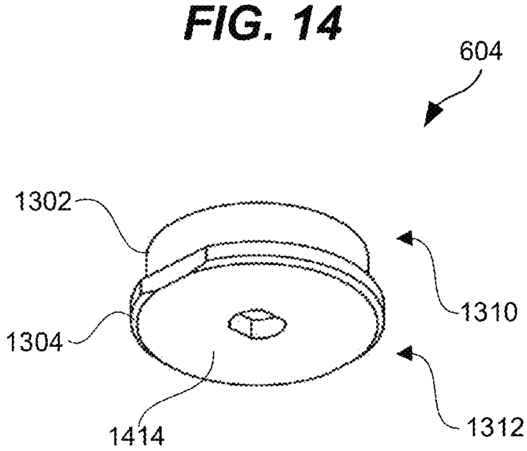

FIGS. 13-14 are perspective views of lower coupler member 604 in an illustrative embodiment. FIGS. 13-14 are not drawn to scale. Lower coupler member 604 comprises a cylindrical body 1302 and a flange 1304. Cylindrical body 1302 is a hollow cylinder having a top end 1310 that is open, and an opposing bottom end 1312 with an end wall 1414 at the bottom end 1312. Flange 1304 is disposed at or toward bottom end 1312 of cylindrical body 1302. Cylindrical body 1302 is dimensioned to fit within circular groove 1220 of upper coupler member 602. Flange 1304 projects radially outward from cylindrical body 1302 to abut the bottom end 812 of upper coupler member 602. Flange 1304 is dimensioned to fit within the hollow portion 103 of survey pole 102.

Figure 15:
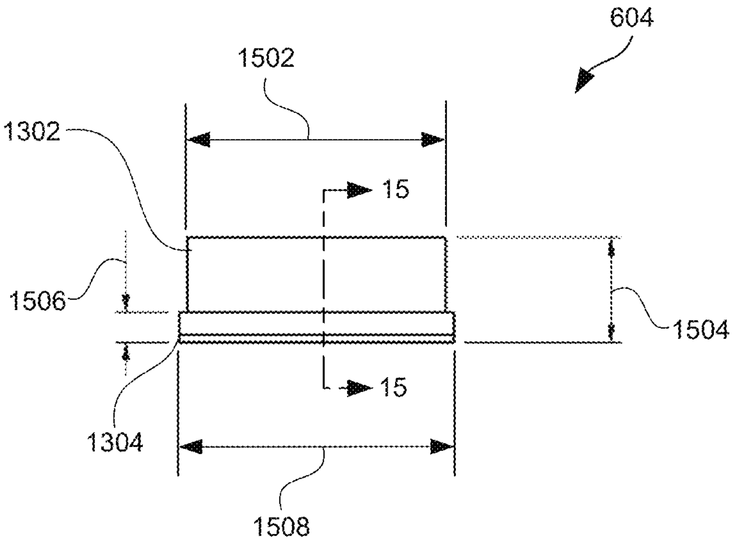
FIG. 15 is a side view of a lower coupler member in an illustrative embodiment.

FIG. 15 is a side view of lower coupler member 604 in an illustrative embodiment. FIG. 15 shows dimensions of lower coupler member 604 in an example, and other dimensions are considered herein. FIG. 15 is not drawn to scale. The length 1504 of cylindrical body 1302 in the axial direction from bottom end 812 to top end 810 may be in the range of about 10-11 mm. The length 1506 or thickness of flange 1304 in the axial direction may be in the range of about 2.5-3.5 mm. Cylindrical body 1302 has an outer diameter 1502 dimensioned to fit in the circular groove 1220 of upper coupler member 602. For example, outer diameter 1502 of cylindrical body 1302 may be in the range of about 24-26 mm. The dimensional relationship between the outer diameter 1502 of cylindrical body 1302 and the inner diameter 1204 of the circular groove 1220 in upper coupler member 602 (see FIG. 12) may define different types of fit. In an embodiment, the dimensional relationship may define a press fit, an interference fit, a clearance fit, etc. Flange 1304 has an outer diameter 1508 greater than the inner diameter 1204 of the circular groove 1220 in upper coupler member 602 (see FIG. 12). For example, outer diameter 1508 of flange 1304 may be in the range of about 29-30 mm.

Figure 16:
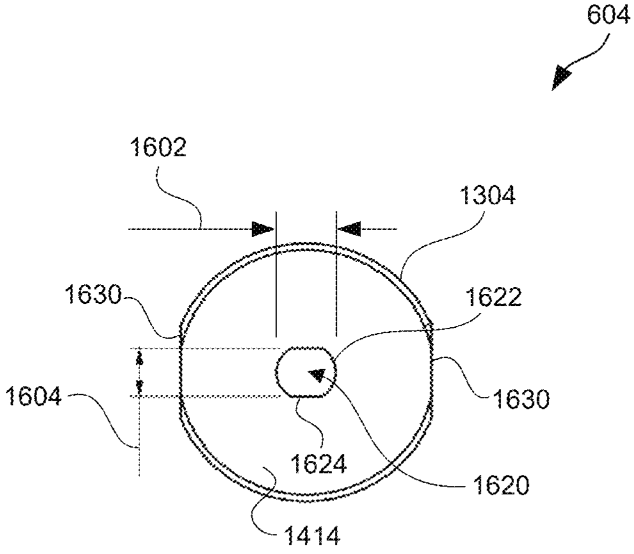
FIG. 16 is a bottom view of a lower coupler member in an illustrative embodiment.

FIG. 16 is a bottom view of lower coupler member 604 in an illustrative embodiment. FIG. 16 shows dimensions of lower coupler member 604 in an example, and other dimensions are considered herein. FIG. 16 is not drawn to scale.

Flange 1304 may have opposing flat sides 1630, and the distance between the flat sides 1630 may be in the range of about 27-28 mm. Further, lower coupler member 604 includes a through-hole 1620 in the axial direction through end wall 1414 to accommodate lower RF connector 212, and may have a diameter 1602 in the range of about 6-7 mm. In an embodiment, through-hole 1620 comprises a flat-sided hole 1622 where the distance 1604 between the flat sides 1624 of the flat-sided hole 1622 may be in the range of about 5-6 mm.

Figure 17:
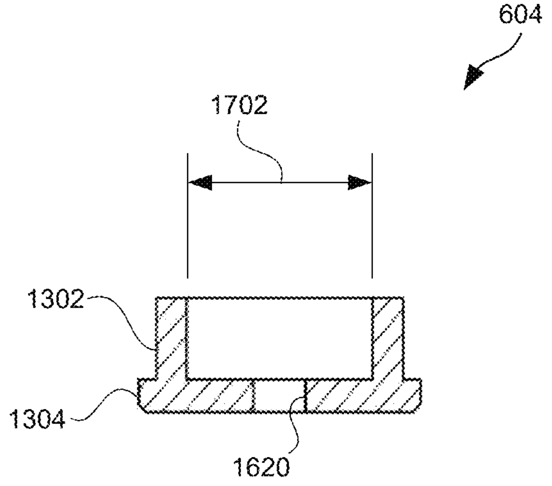
FIG. 17 is a cross-sectional view of a lower coupler member in an illustrative embodiment.

FIG. 17 is a cross-sectional view of lower coupler member 604 in an illustrative embodiment. The view in FIG. 17 is along cut plane 15-15 in FIG. 15. FIG. 17 shows dimensions of lower coupler member 604 in an example, and other dimensions are considered herein. FIG. 17 is not drawn to scale. The cylindrical body 1302 of lower coupler member 604 is a hollow cylinder having an inner diameter 1702, which may be in the range of about 19-20 mm.

Figure 18:
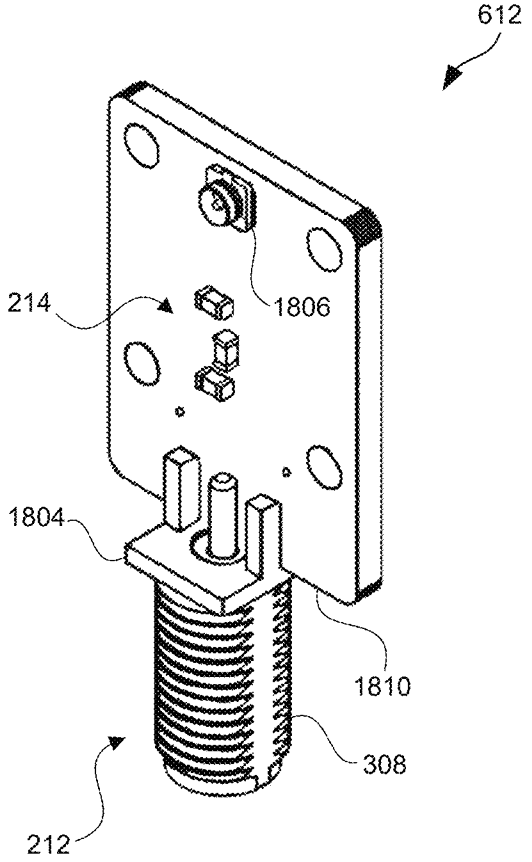
FIG. 18 is a perspective view of a PCB in an illustrative embodiment.

FIG. 18 is a perspective view of PCB 612 in an illustrative embodiment. FIG. 18 is not drawn to scale. PCB 612 is a medium used to connect electrical components to one another. PCB 612 includes a set of electrical components comprising an antenna tuning circuit 214 for the antenna 106. PCB 612 further comprises a surface-mount RF connector 1806 electrically coupled to antenna tuning circuit 214 through wires, traces, pads, etc. For example, surface-mount RF connector 1806 may comprise a U.FL series connector. Surface-mount RF connector 1806 may be electrically coupled to upper RF connector 210 through an RF cable 614, as illustrated in FIG. 6. In an embodiment, lower RF connector 212 may comprise an edge connector 1804 that is installed along an edge 1810 (i.e., bottom edge) of PCB 612, and is electrically coupled to antenna tuning circuit 214 through wires, traces, pads, etc.

Figure 19:
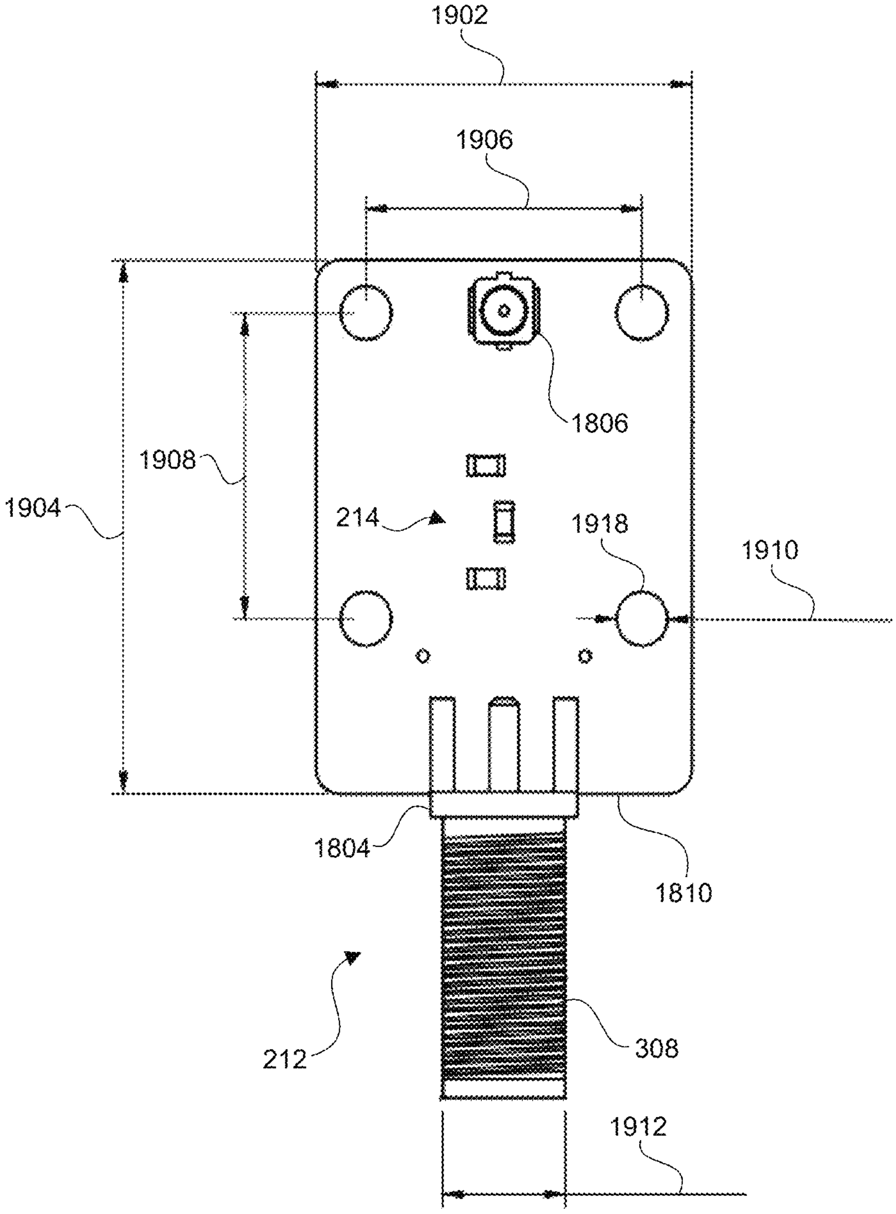
FIG. 19 is a front view of a PCB in an illustrative embodiment.

FIG. 19 is a front view of PCB 612 in an illustrative embodiment. FIG. 19 shows dimensions of PCB 612 in an example, and other dimensions are considered herein. FIG. 19 is not drawn to scale. PCB 612 has a width 1902 in the range of about 16-17 mm, and a height 1904 in the range of about 21-22 mm. PCB 612 includes a set of screw clearance holes 1918 having a diameter 1910 in the range of about 2.0-2.4 mm. The distance 1906 between the screw clearance holes 1918 in the width direction is in the range of about 11.5-12.5 mm, and the distance 1908 between the screw clearance holes 1918 in the height direction is in the range of about 12-13 mm. The diameter 1912 of the threaded end 308 of lower RF connector 212 may be about ¼ inch. In this embodiment, lower RF connector 212 may comprise an edge-mount, SMA female connector 611.

Figure 20:
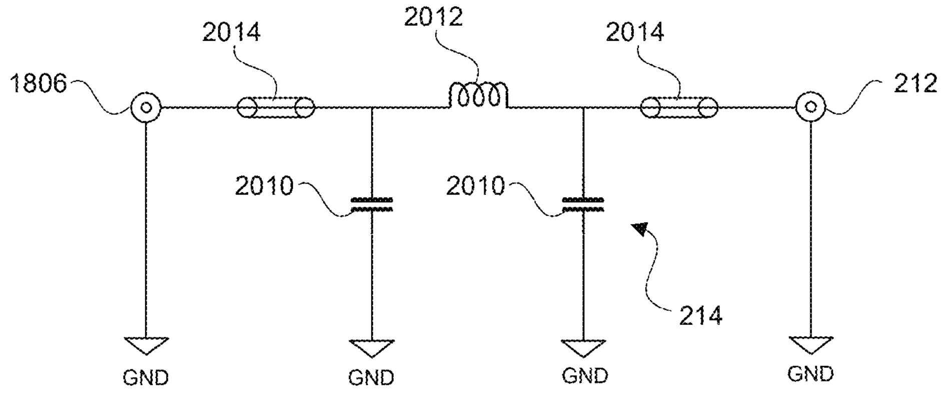
FIG. 20 is a schematic diagram of a PCB in an illustrative embodiment.

FIG. 20 is a schematic diagram of PCB 612 in an illustrative embodiment. In an embodiment, antenna tuning circuit 214 comprises an antenna matching network (e.g., Pi network) having a pair of capacitors 2010 and a series inductor 2012. The antenna tuning circuit 214 acts to substantially match the impedance of the antenna 106 and the RF transceiver 142 of the survey instrument 130. In series between the surface-mount RF connector 1806 and the lower RF connector 212, PCB 612 includes a first Grounded Co-Planar Waveguide (GCPW) 2014, the inductor 2012, and a second GCPW 2014. A capacitor 2010 is connected in parallel at a junction between the first GCPW 2014 and the inductor 2012, and the other capacitor 2010 is connected in parallel at a junction between the inductor 2012 and the second GCPW 2014. Although one type of antenna matching network is illustrated, other types are considered herein.

One technical benefit of survey pole assembly 100 is when assembled as shown in FIG. 5, antenna 106 is integrated in the survey pole 102. Thus, when a survey instrument 130 is attached to pole adapter 104, there is no external antenna that can be damaged during use.

Figure 21:
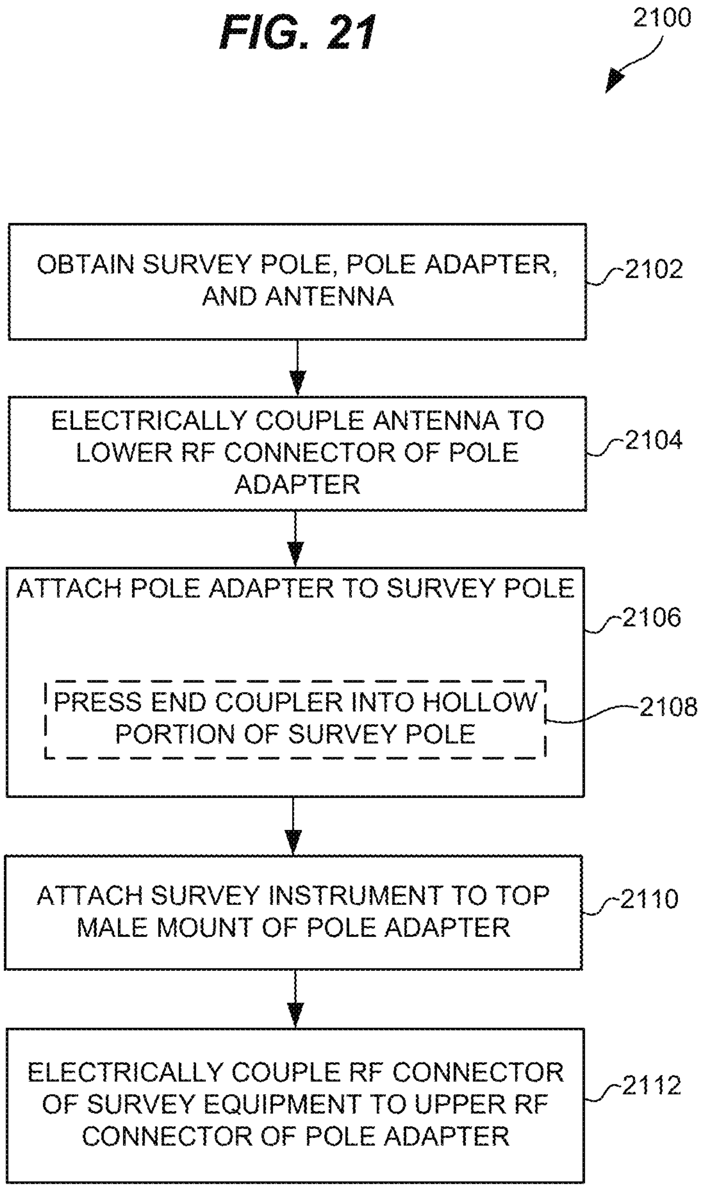
FIG. 21 is a flow chart illustrating a method of assembling survey equipment in an illustrative embodiment.

FIG. 21 is a flow chart illustrating a method 2100 of assembling survey equipment in an illustrative embodiment. The steps of the flow charts described herein are not all inclusive and may include other steps not shown, and the steps may be performed in an alternative order.

A survey pole assembly 100 comprising a survey pole 102, a pole adapter 104, and an antenna 106 are acquired or obtained as described above (step 2102). The antenna 106 is electrically coupled to the lower RF connector 212 of pole adapter 104 (step 2104). For example, the RF connector 636 on antenna 106 may be screwed onto the threaded end 308 of lower RF connector 212, which creates electrical contact between a male pin in RF connector 636 and a female receptacle in lower RF connector 212. Pole adapter 104 is attached to survey pole 102 (step 2106). For example, end coupler 202 may be pressed or otherwise inserted into the hollow portion 103 of the survey pole 102 through the top end 110 (optional step 2108). An epoxy or another type of environmental seal may be used to attach end coupler 202 to survey pole 102. With pole adapter 104 attached to survey pole 102, antenna 106 is integrated in the survey pole 102. A survey instrument 130 is physically attached or mechanically coupled/mounted to the top male mount 204 of the pole adapter 104 (step 2110).

Figure 22:
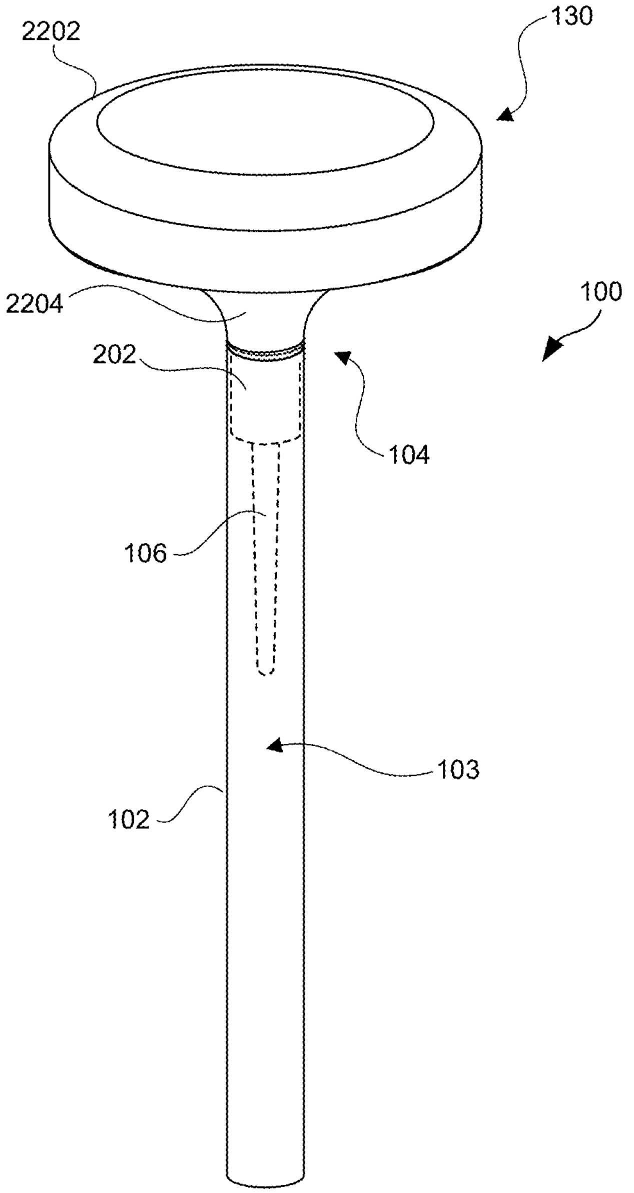
FIG. 22 is a perspective view illustrating a survey instrument physically attached to a top male mount of a pole adapter in an illustrative embodiment.

FIG. 22 is a perspective view illustrating a survey instrument 130 physically attached to the top male mount 204 (not visible) of the pole adapter 104 in an illustrative embodiment. FIG. 22 is not drawn to scale. Survey instrument 130 includes a housing 2202 that houses the internal components, such as satellite antenna 134, satellite receiver 136, etc. (see FIG. 1). Housing 2202 includes a base 2204 or bottom side that includes a mount for mounting on a survey pole. For example, base 2204 of housing 2202 may comprise a standard female mount (i.e., ⅝-inch threaded hole with 11 TPI). When top male mount 204 comprises a ⅝-inch threaded rod with 11 TPI, survey instrument 130 may be screwed directly onto top male mount 204. With survey instrument 130 mounted, pole adapter 104 sits in-line between survey pole 102 and survey instrument 130.

Figure 23A:
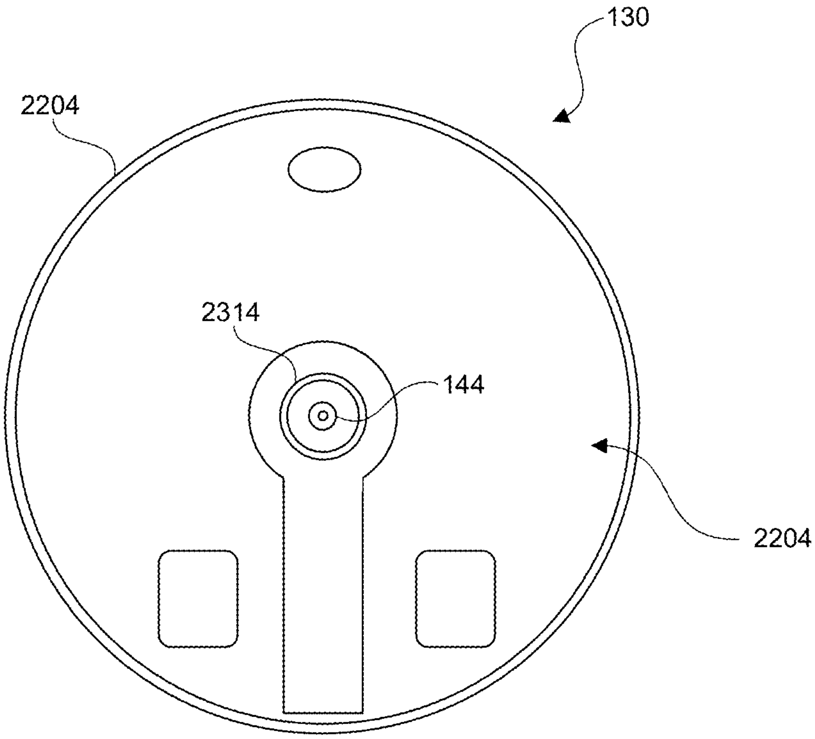
FIG. 23A illustrates a base of a survey instrument in an illustrative embodiment.

In FIG. 21, RF connector 144 of survey instrument 130 is electrically coupled to upper RF connector 210 of pole adapter 104 (step 2112). According to the structure of the pole adapter 104 as described above, steps 2110-2112 may be accomplished in a single step. FIG. 23A illustrates a base 2204 of a survey instrument 130 in an illustrative embodiment. The base 2204 of survey instrument 130 includes a female mount 2314 (e.g., ⅝-inch threaded hole). In an embodiment, RF connector 144 of survey instrument 130 may be embedded in female mount 2314. When survey instrument 130 is screwed onto pole adapter 104 via female mount 2314 and top male mount 204, an electrical connection is made between RF connector 144 of survey instrument 130 and upper RF connector 210 of pole adapter 104. For example, rotating female mount 2314 of survey instrument 130 onto top male mount 204 creates electrical contact between a male pin in upper RF connector 210 and a female receptacle in RF connector 144 of survey instrument 130.

Figure 23B:
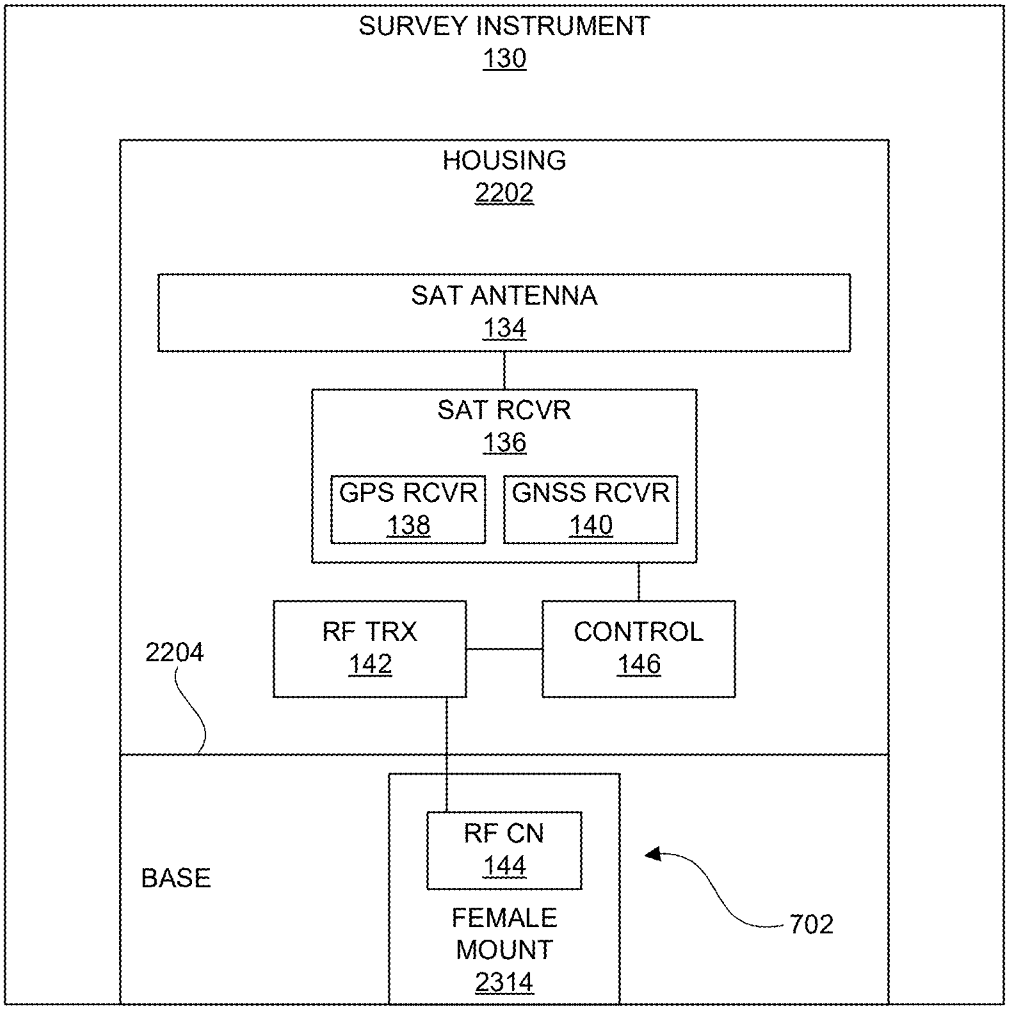
FIG. 23B is a schematic diagram of a survey instrument in an illustrative embodiment.

FIG. 23B is a schematic diagram of survey instrument 130 in an illustrative embodiment. Survey instrument 130 includes a housing 2202 that houses the internal electrical equipment, such as a satellite antenna 134, a satellite receiver 136, an RF transceiver 142 (TRX), and/or a controller 146. The base 2204 of housing 2202 includes a female mount 2314 (e.g., ⅝-inch threaded hole), and an RF connector 144 (CN) is embedded in the female mount 2314. With this configuration, female mount 2314 and RF connector 144 of survey instrument 130 comprise a combined RF/mechanical coupling 702. In other words, RF connector 144 is disposed within or is internal to female mount 2314. Thus, when a survey instrument 130 is physically mounted on top male mount 204 of pole adapter 104, RF connector 144 makes electrical contact with upper RF connector 210 in top male mount 204 of pole adapter 104.

Figure 24:
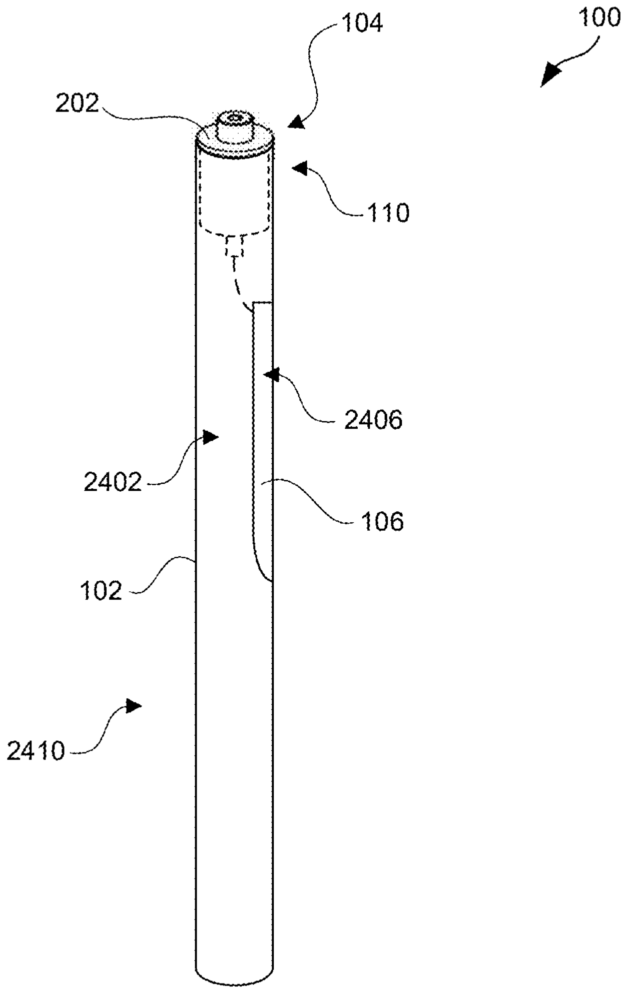
FIG. 24 is a perspective view of a survey pole assembly when assembled in an illustrative embodiment.

In an embodiment, an antenna 106 may be embedded in the body of the survey pole 102. FIG. 24 is a perspective view of survey pole assembly 100 when assembled in an illustrative embodiment. FIG. 24 is not drawn to scale. In this embodiment, the main body 2410 of survey pole 102 is formed or fabricated from a non-conductive material 2402, such as fiber glass, plastic, etc. A conductive material 2406 (e.g., copper, aluminum, etc.) is embedded in the main body 2410 of survey pole 102 to form the antenna 106. For example, survey pole 102 may be fabricated with an additive manufacturing process or the like that deposits the non-conductive material 2402 to form main body 2410, and the conductive material 2406 to embed the antenna 106 in the main body 2410. In another example, a conductive material 2406 or conductive foil may be laminated to the pole interior, or embedded between layers of composite material (e.g., fiberglass).

Figure 25:
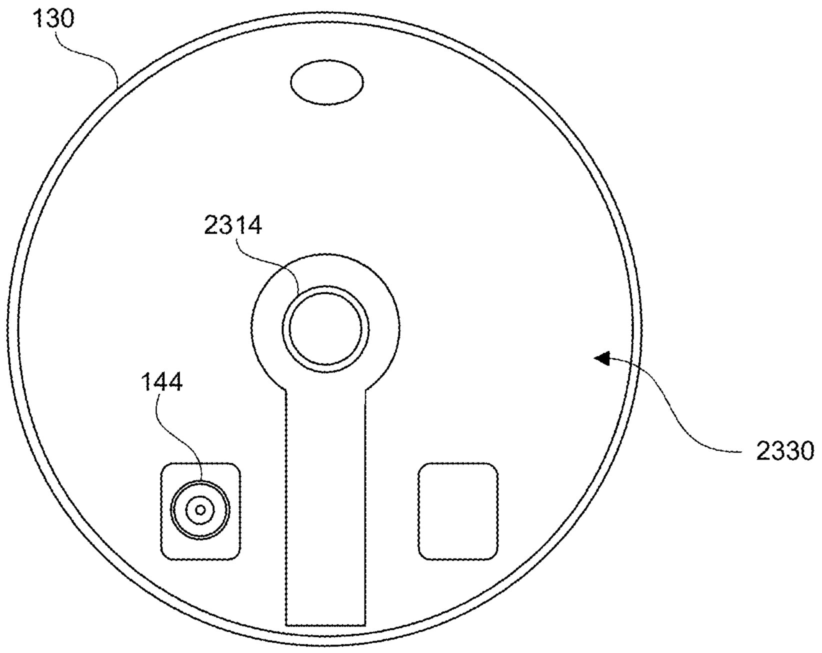
FIG. 25 illustrates a base of a survey instrument in an illustrative embodiment.

In an embodiment, survey instrument 130 may be of a type that the RF connector 144 is not embedded in female mount 2314. FIG. 25 illustrates a base 2330 of a survey instrument 130 in an illustrative embodiment. In this embodiment, survey instrument 130 again includes a female mount 2314 (e.g., ⅝-inch threaded hole) at base 2330. However, RF connector 144 of survey instrument 130 is separate from female mount 2314. Thus, when survey instrument 130 is screwed onto pole adapter 104 via female mount 2314 and top male mount 204, there is no electrical connection made between RF connector 144 of survey instrument 130 and upper RF connector 210 of pole adapter 104.

To accommodate a survey instrument 130 having an RF connector 144 separate from the female mount 2314, survey pole assembly 100 may further comprise a breakout adapter to be used with pole adapter 104.

Figure 26:
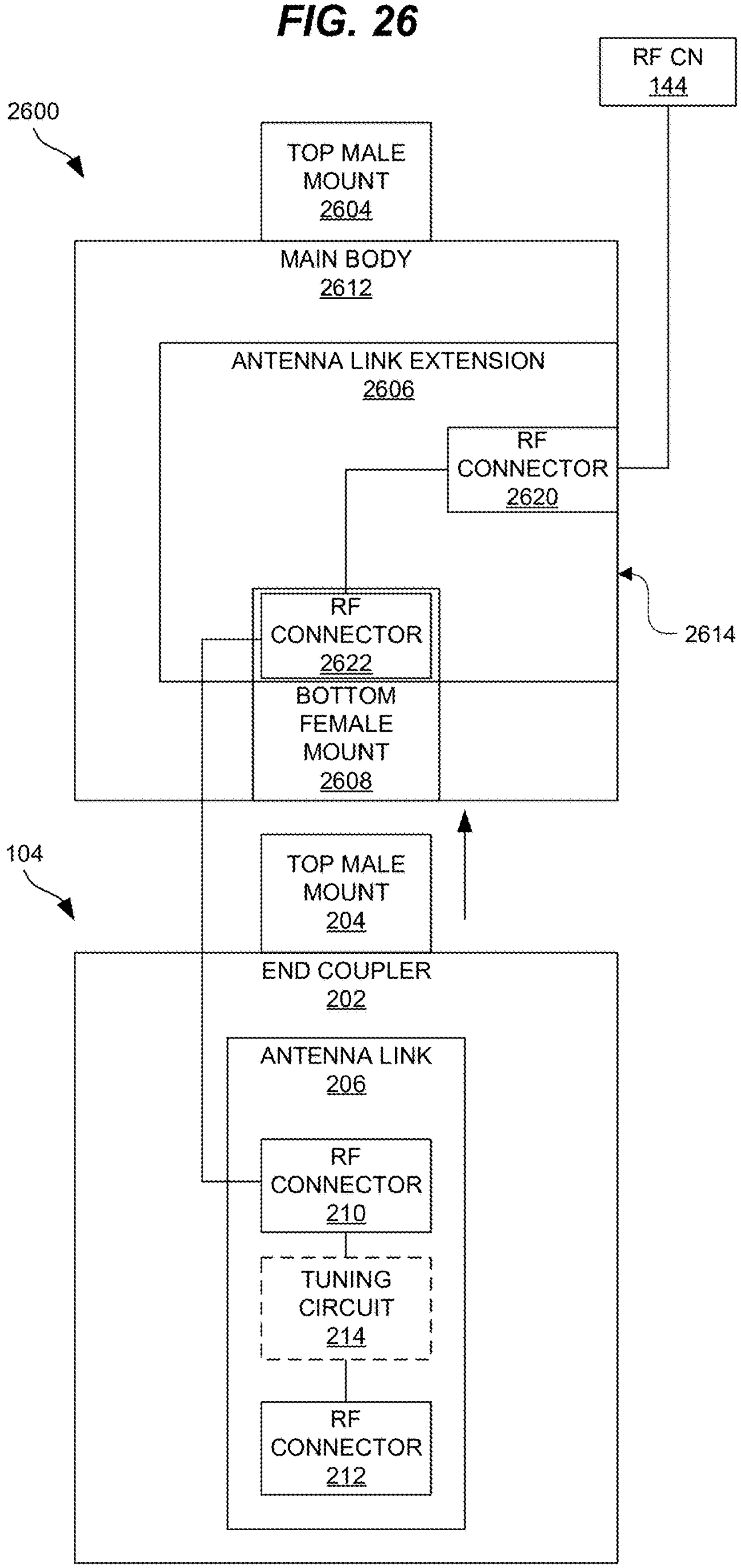
FIG. 26 is a schematic view of a breakout adapter in an illustrative embodiment.

FIG. 26 is a schematic view of breakout adapter 2600 in an illustrative embodiment. In an embodiment, breakout adapter 2600 is configured to couple between pole adapter 104 and a survey instrument 130. Breakout adapter 2600 comprises a main body 2612 having a top male mount 2604 and a bottom female mount 2608. Top male mount 2604 is a physical or mechanical mount configured for mounting a survey instrument 130. For example, a base for a survey instrument 130 may comprise a standard female mount, which is a ⅝-inch threaded hole with 11 TPI. Thus, top male mount 2604 may comprise a ⅝-inch threaded rod with 11 TPI, however other types of mounts are considered herein. Bottom female mount 2608 is a physical or mechanical mount configured for mounting on the top male mount 204 of pole adapter 104. For example, bottom female mount 2608 may comprise a ⅝-inch threaded hole with 11 TPI. Breakout adapter 2600 therefore sits in-line between the pole adapter 104 and the survey instrument 130.

Breakout adapter 2600 further comprises an antenna link extension 2606 configured to provide electrical connectivity between a survey instrument 130 and pole adapter 104. Antenna link extension 2606 comprises a side RF connector 2620 electrically connected to a bottom RF connector 2622. Side RF connector 2620 is disposed through a side wall 2614 of main body 2612, and is configured to mate with or couple to a corresponding RF connector 144 of a survey instrument 130. Bottom RF connector 2622 is configured to mate with or couple to upper RF connector 210 of pole adapter 104.

As illustrated in FIG. 26, breakout adapter 2600 may be mounted on top male mount 204 of pole adapter 104 via bottom female mount 2608. When mounted, bottom RF connector 2622 is configured to electrically couple to upper RF connector 210 pole adapter 104. Thus, electrical connectivity is provided between the RF connector 144 of the survey instrument 130 and the antenna 106 (not shown) that is coupled to lower RF connector 212. Although shown as separate elements, pole adapter 104 and breakout adapter 2600 may be formed as a single, monolithic body in other embodiments.

The following figures provide examples of the breakout adapter 2600.

Figure 27:
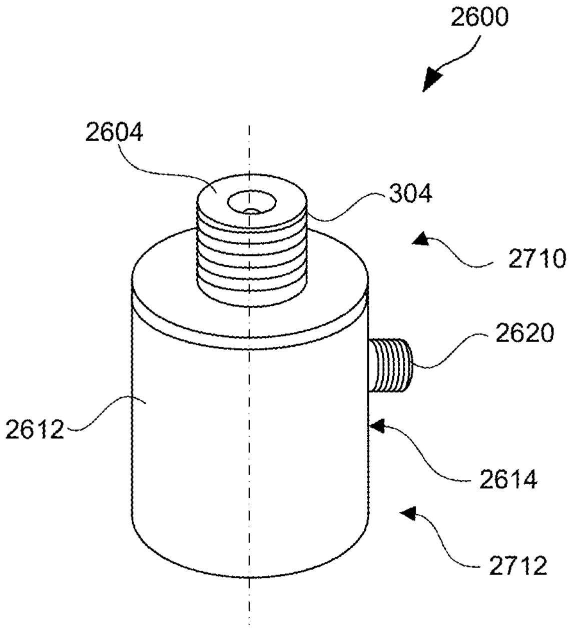
FIGS. 27-28 are perspective views of a breakout adapter in an illustrative embodiment.
Figure 28:
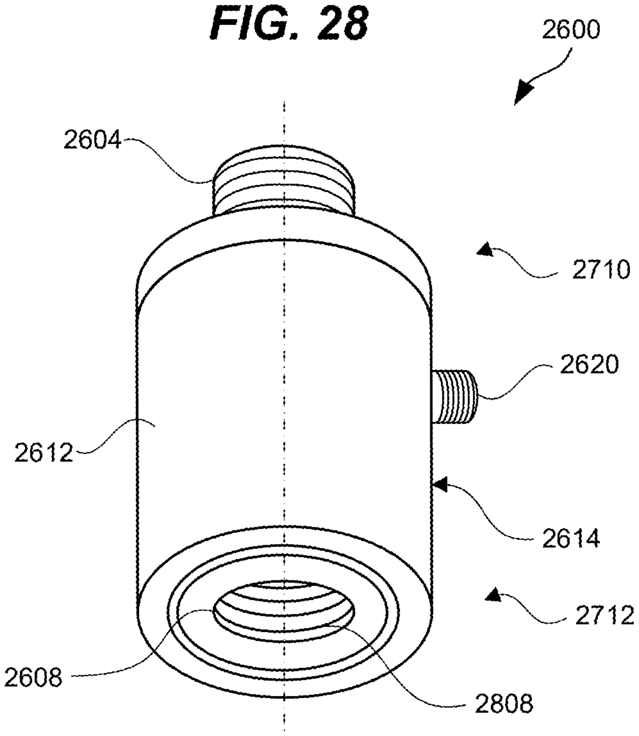
Figure 29:
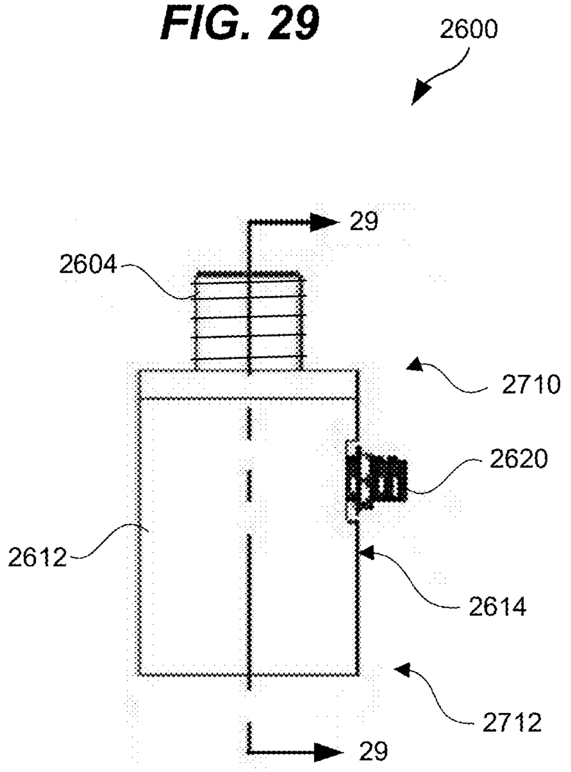
FIG. 29 is a side view of a breakout adapter in an illustrative embodiment.

FIGS. 27-28 are perspective views of breakout adapter 2600, and FIG. 29 is a side view of breakout adapter 2600 in an illustrative embodiment. FIGS. 27-29 are not drawn to scale. Breakout adapter 2600 comprises a main body 2612 having a top male mount 2604 disposed at a top end 2710, and a bottom female mount 2608 is disposed at a bottom end 2712. In an embodiment, top male mount 2604 may comprise a threaded rod 304 (e.g., ⅝-inch 11 TPI) that projects axially from top end 2710 of main body 2612. In an embodiment, bottom female mount 2608 may comprise a threaded hole 2808 that recesses axially from bottom end 2712 of main body 2612. As shown in FIGS. 27-28, top male mount 2604 and bottom female mount 2608 may be coaxial.

Side RF connector 2620 is disposed through a side wall 2614 of main body 2612. Although side RF connector 2620 may have different orientations, in one embodiment, side RF connector 2620 may be oriented substantially perpendicular to the axis of breakout adapter 2600. Side RF connector 2620 may comprise an SMA male connector (50Ω), for example.

Figure 30:
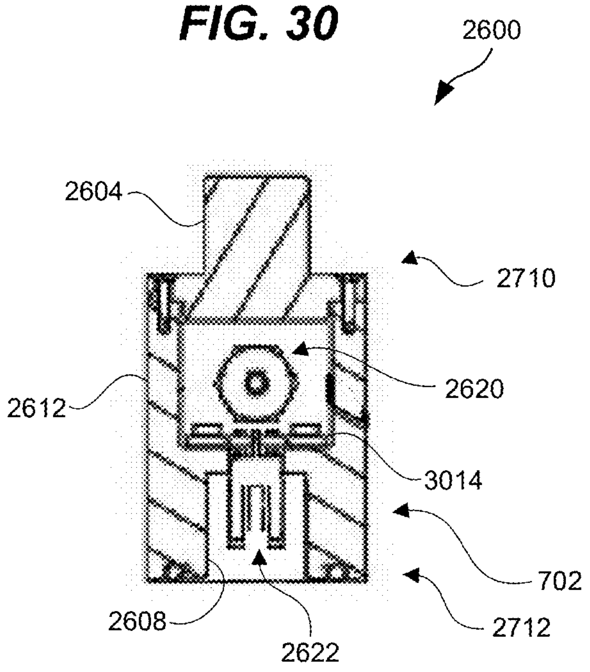
FIG. 30 is a cross-sectional view of a breakout adapter in an illustrative embodiment.

FIG. 30 is a cross-sectional view of breakout adapter 2600 in an illustrative embodiment. The view in FIG. 30 is along cut plane 29-29 in FIG. 29. FIG. 30 is not drawn to scale. Bottom female mount 2608 and bottom RF connector 2622 of breakout adapter 2600 comprise a combined RF/mechanical coupling 702. In other words, bottom RF connector 2622 is disposed within or is internal to bottom female mount 2608. Thus, when bottom female mount 2608 is mounted on top male mount 204 of pole adapter 104, the bottom RF connector 2622 of breakout adapter 2600 makes electrical contact with upper RF connector 210 in top male mount 204 of pole adapter 104. Further, bottom RF connector 2622 is electrically coupled to side RF connector 2620 via an electrical connection 3014, which may comprise an RF cable, an RF network comprising a PCB, or another desired coupling.

Figure 31:
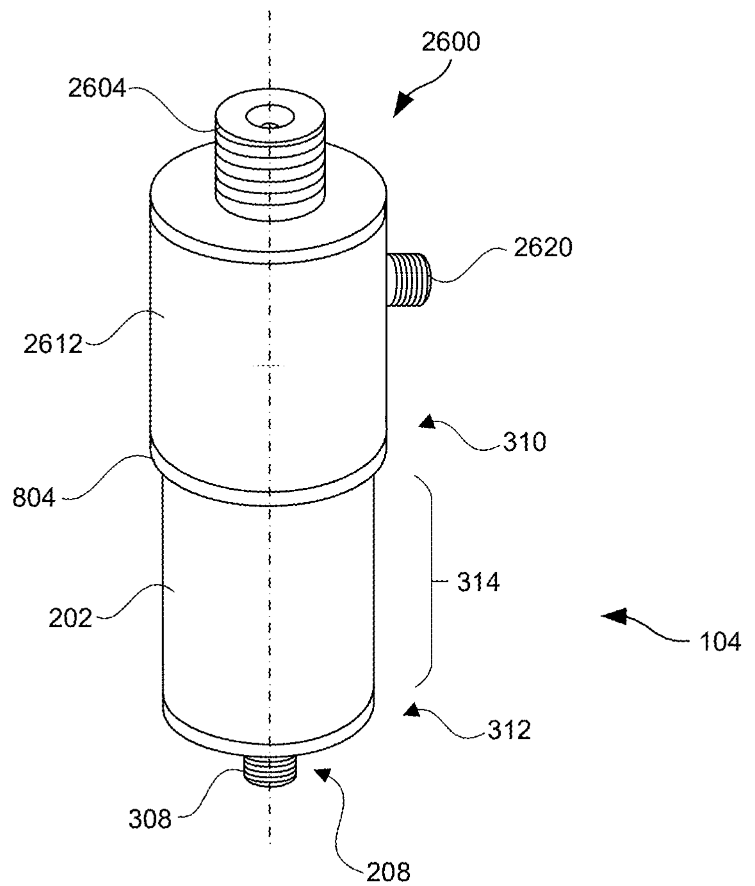
FIG. 31 is a perspective view of a breakout adapter attached to a pole adapter in an illustrative embodiment.

FIG. 31 is a perspective view of breakout adapter 2600 attached to pole adapter 104 in an illustrative embodiment. FIG. 31 is not drawn to scale. To attach breakout adapter 2600 to pole adapter 104, the bottom female mount 2608 of breakout adapter 2600 may be screwed directly onto top male mount 204 of pole adapter 104.

Figure 32:
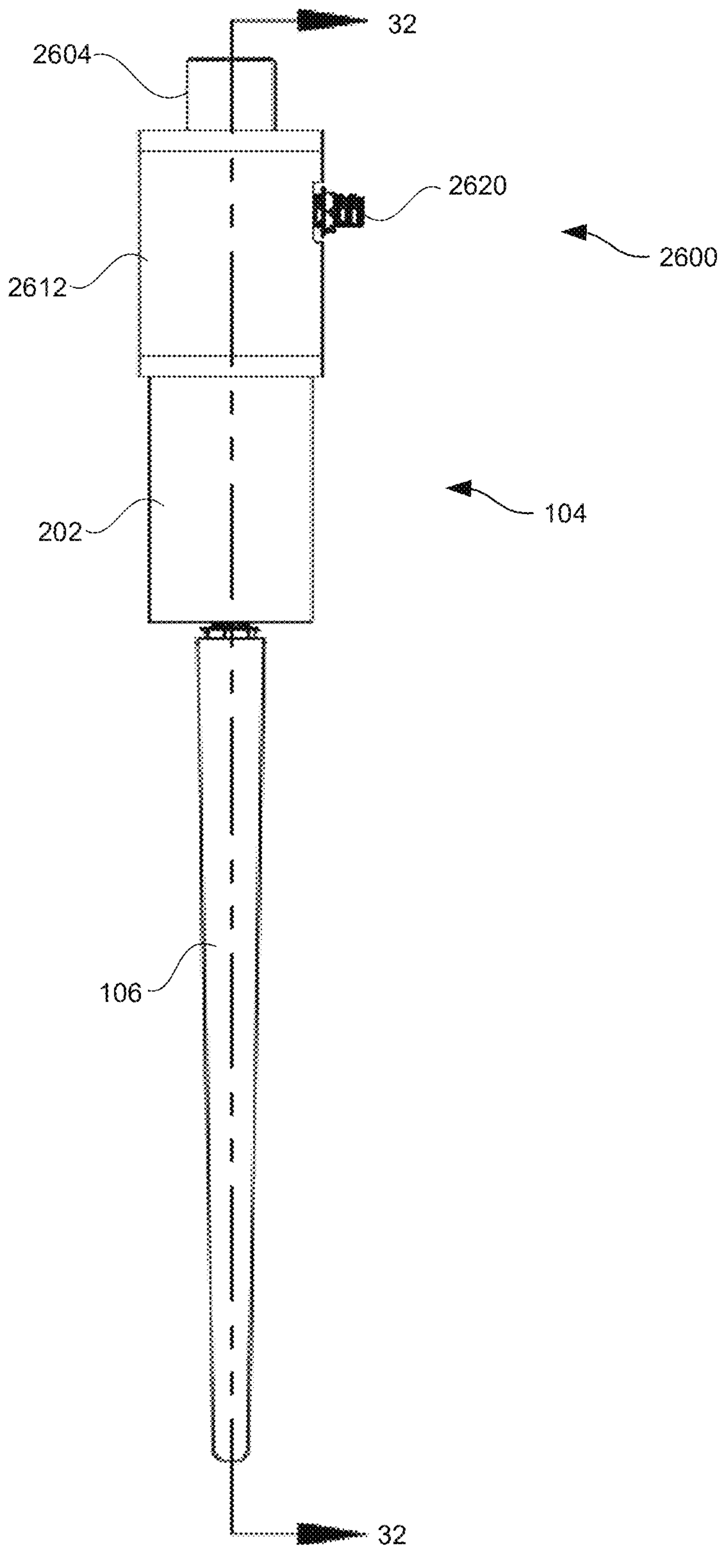
FIG. 32 is a side view of a breakout adapter, pole adapter, and antenna in an illustrative embodiment.
Figure 33:
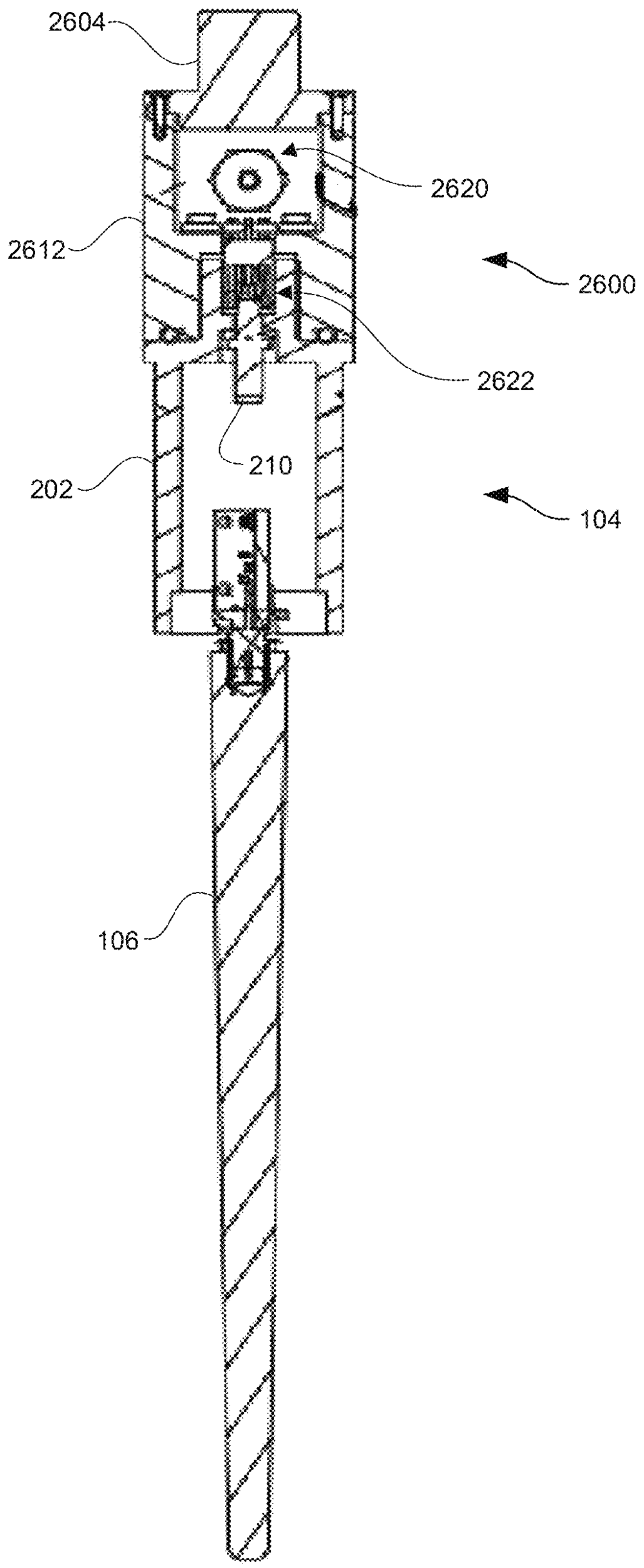
FIG. 33 is a cross-sectional view of a breakout adapter, pole adapter, and antenna in an illustrative embodiment.
Figure 34:
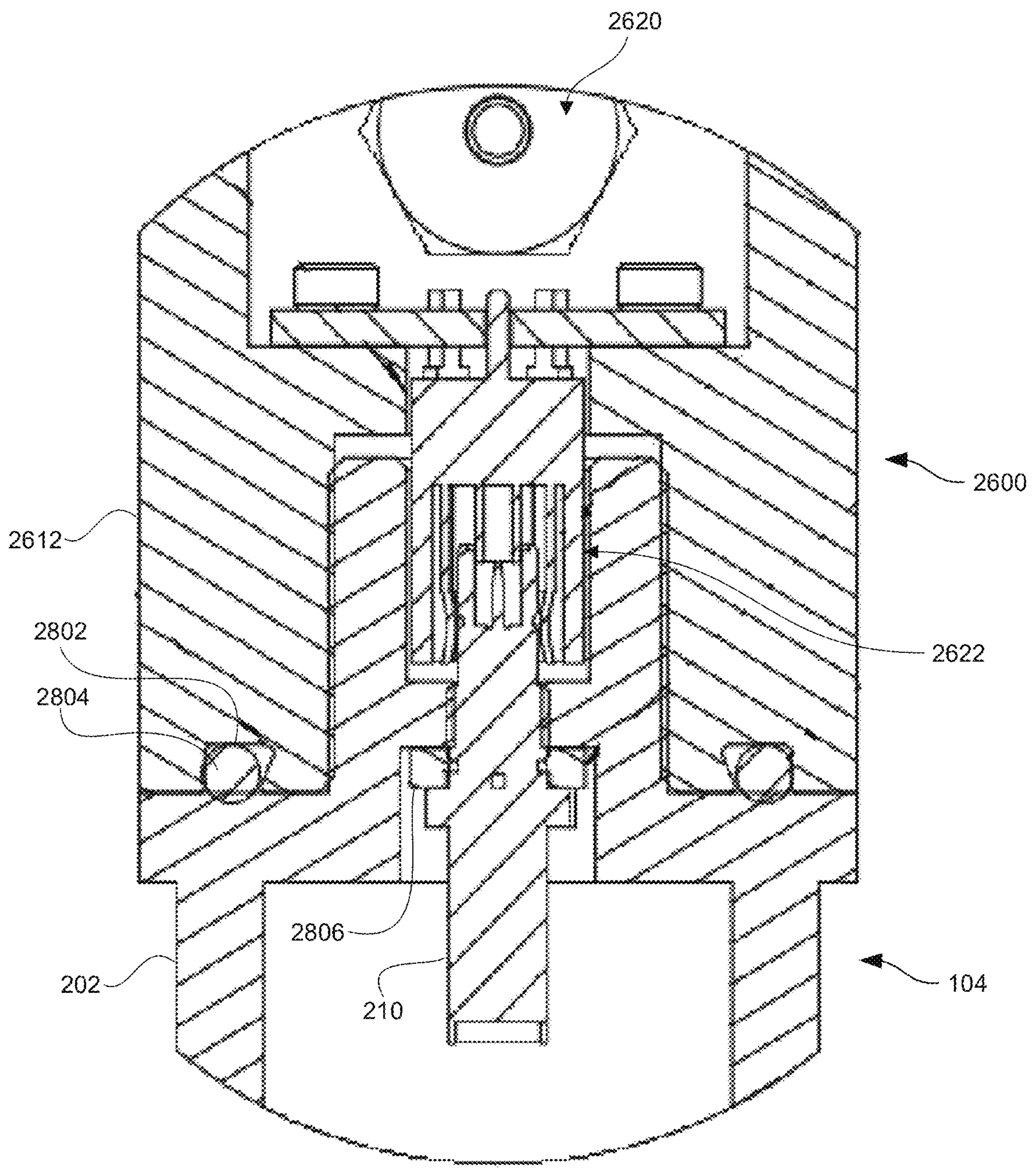
FIG. 34 is a magnified cross-sectional view of a combined RF/mechanical coupling between a breakout adapter and a pole adapter in an illustrative embodiment.

FIG. 32 is a side view of breakout adapter 2600, pole adapter 104, and antenna 106 in an illustrative embodiment. FIG. 33 is a cross-sectional view of breakout adapter 2600, pole adapter 104, and antenna 106 in an illustrative embodiment. The view in FIG. 33 is along cut plane 32-32 in FIG. 32. FIG. 34 is a magnified cross-sectional view of the combined RF/mechanical coupling 702 between breakout adapter 2600 and pole adapter 104 in an illustrative embodiment. FIGS. 32-34 are not drawn to scale. When breakout adapter 2600 is screwed onto pole adapter 104, bottom RF connector 2622 disposed within bottom female mount 2608 makes electrical contact with upper RF connector 210 in top male mount 204 of pole adapter 104. Thus, there is an electrical connection between side RF connector 2620 and antenna 106 (through antenna link 206 and antenna link extension 2606). When a survey instrument 130 is mounted on top male mount 2604 of breakout adapter 2600, an RF connector 144 of the survey instrument 130 may be electrically coupled to side RF connector 2620 with an RF cable (e.g., pigtail cable).

In an embodiment, bottom end 2712 of main body 2612 may include an O-ring groove 2802 with an O-ring 2804 disposed in the O-ring groove 2802. When breakout adapter 2600 is screwed onto pole adapter 104, the O-ring 2804 creates a seal (i.e., a face seal) between breakout adapter 2600 and pole adapter 104. It is noted that a similar O-ring groove/O-ring feature may be implemented on a survey instrument 130 to create a seal between the survey instrument 130 and the pole adapter 104. One technical benefit is the seal prevents water ingress interfering with or shorting out the RF electrical connection between the survey instrument 130 and the antenna 106.

In an embodiment, a sealing compression washer 2806 may be disposed between upper RF connector 210 and end coupler 202. One technical benefit is the sealing compression washer 2806 prevents water/humidity ingress into end coupler 202 where the PCB 612 is housed, which protects it from corrosion.

Figure 35:
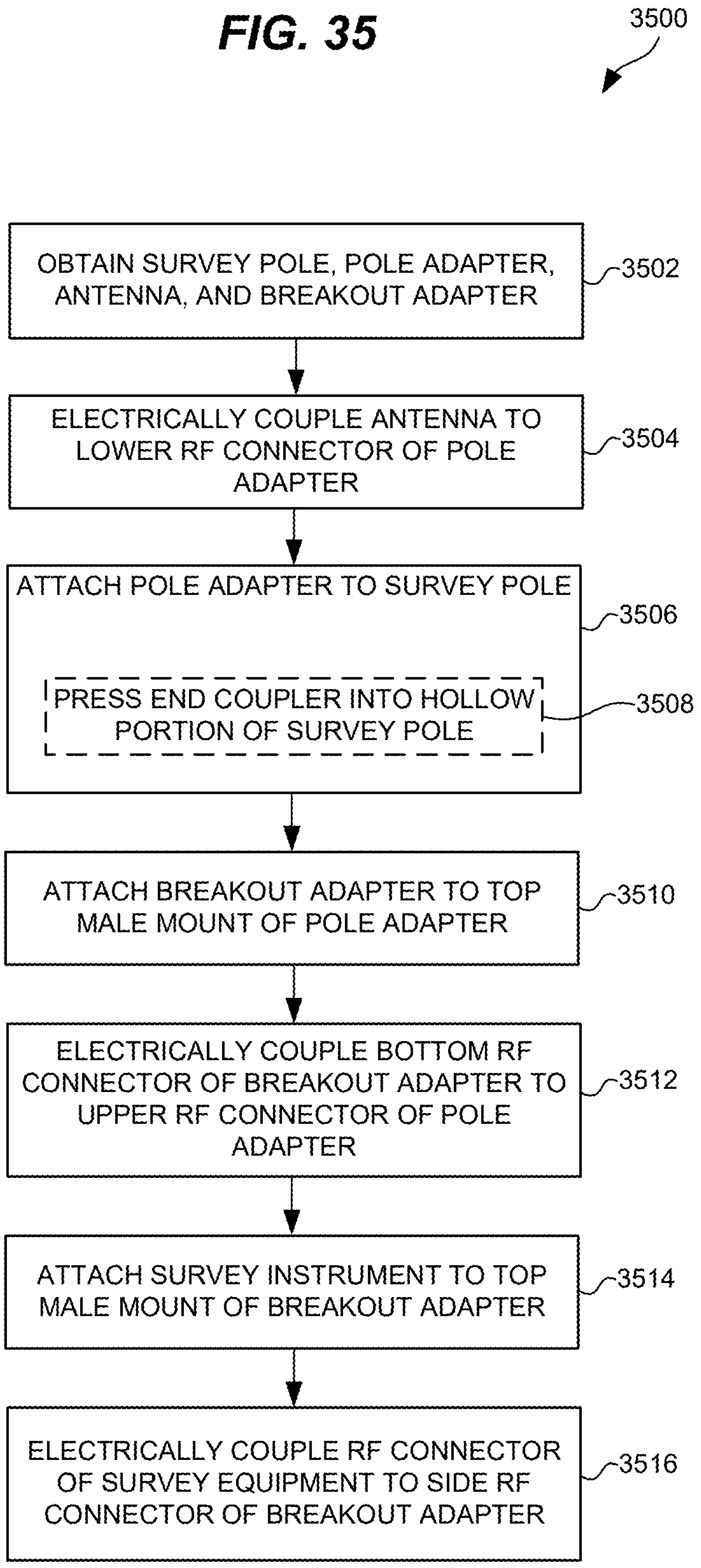
FIG. 35 is a flow chart illustrating a method of assembling survey equipment in an illustrative embodiment.

FIG. 35 is a flow chart illustrating a method 3500 of assembling survey equipment in an illustrative embodiment. The steps of the flow charts described herein are not all inclusive and may include other steps not shown, and the steps may be performed in an alternative order.

A survey pole assembly 100 comprising survey pole 102, pole adapter 104, breakout adapter 2600, and antenna 106 are acquired or obtained as described above (step 3502). The antenna 106 is electrically coupled to the lower RF connector 212 of pole adapter 104 (step 3504). For example, the RF connector 636 on antenna 106 may be screwed onto the threaded end 308 of lower RF connector 212, which creates electrical contact between a male pin in RF connector 636 and a female receptacle in lower RF connector 212. Pole adapter 104 is attached to survey pole 102 (step 3506). For example, end coupler 202 may be pressed or otherwise inserted into the hollow portion 103 of the survey pole 102 through the top end 110 (optional step 3508). An epoxy or another type of environmental seal may be used to attach end coupler 202 to survey pole 102. With pole adapter 104 attached to survey pole 102, antenna 106 is integrated in the survey pole 102.

Breakout adapter 2600 is physically attached to the top male mount 204 of the pole adapter 104 (step 3510). More particularly, bottom female mount 2608 may be screwed directly onto top male mount 204 of pole adapter 104. Bottom RF connector 2622 of breakout adapter 2600 is electrically coupled to upper RF connector 210 of pole adapter 104 (step 3512). According to the structures of the pole adapter 104 and breakout adapter 2600 as described above, steps 3510-3512 may be accomplished in a single step. Bottom RF connector 2622 of breakout adapter 2600 is embedded in bottom female mount 2608. When breakout adapter 2600 is screwed onto pole adapter 104 via bottom female mount 2608 and top male mount 204, an electrical connection is made between bottom RF connector 2622 of breakout adapter 2600 and upper RF connector 210 of pole adapter 104. For example, rotating bottom female mount 2608 of breakout adapter 2600 onto top male mount 204 creates electrical contact between a male pin in upper RF connector 210 and a female receptacle in bottom RF connector 2622 of breakout adapter 2600.

A survey instrument 130 is physically attached to the top male mount 2604 of the breakout adapter 2600 (step 3514). As described above, a base for survey instrument 130 may comprise a standard female mount (i.e., ⅝-inch threaded hole with 11 TPI). When top male mount 2604 comprises a ⅝-inch threaded rod with 11 TPI, survey instrument 130 may be screwed directly onto top male mount 2604. RF connector 144 of survey instrument 130 is electrically coupled to side RF connector 2620 of breakout adapter 2600 (step 3516). For example, an RF cable may be attached between RF connector 144 of survey instrument 130 and side RF connector 2620 of breakout adapter 2600.

One technical benefit is the pole adapter 104 may be used with survey instruments 130 that do not have a combined RF connector/female mount, through breakout adapter 2600.

Although specific embodiments were described herein, the scope of the invention is not limited to those specific embodiments. The scope of the invention is defined by the following claims and any equivalents thereof.

What is claimed is:

1. A survey pole assembly, comprising:

a pole adapter configured to attach to a top end of a survey pole; and an antenna integrated in the survey pole;

wherein the pole adapter comprises:

a top male mount configured to mechanically couple to a survey instrument; and an antenna link comprising an upper Radio Frequency (RF) connector electrically coupled to a lower RF connector, wherein the upper RF connector is configured to electrically connect to a corresponding RF connector of the survey instrument, and the lower RF connector is configured to electrically connect to the antenna integrated in the survey pole.

2. The survey pole assembly of claim 1, wherein the pole adapter further comprises:

a bottom antenna mount configured to hold the antenna within a hollow portion of the survey pole.

3. The survey pole assembly of claim 2, wherein:

the bottom antenna mount comprises a threaded end of the lower RF connector that projects axially from a bottom end of the pole adapter.

4. The survey pole assembly of claim 1, wherein:

the top male mount and the upper RF connector comprise a combined RF and mechanical coupling.

5. The survey pole assembly of claim 4, wherein:

the upper RF connector is disposed within the top male mount.

6. The survey pole assembly of claim 1, wherein:

the top male mount includes a threaded hole that forms a threaded connection with the upper RF connector.

7. The survey pole assembly of claim 1, wherein the pole adapter further comprises:

an end coupler configured to engage the top end of the survey pole, the end coupler comprising:

a cylindrical body dimensioned to fit in a hollow portion of the survey pole; and a flange that projects radially from the cylindrical body, wherein an outer diameter of the flange is greater than an inner diameter of the survey pole;

wherein the top male mount projects axially from a top end of the cylindrical body.

8. The survey pole assembly of claim 1, wherein the antenna link further comprises:

an antenna tuning circuit disposed between the upper RF connector and the lower RF connector.

9. The survey pole assembly of claim 1, further comprising:

a breakout adapter comprising:

a main body having a top male mount and a bottom female mount; and an antenna link extension;

wherein the bottom female mount is configured to mechanically couple to the top male mount of the pole adapter;

wherein the top male mount of the breakout adapter is configured to mechanically couple to the survey instrument;

wherein the antenna link extension is configured to electrically couple the survey instrument and the pole adapter.

10. The survey pole assembly of claim 9, wherein the antenna link extension comprises:

a side RF connector disposed through a side wall of the main body of the breakout adapter; and a bottom RF connector configured to electrically connect to the upper RF connector of the pole adapter.

11. The survey pole assembly of claim 10, wherein:

the bottom female mount and the bottom RF connector of the breakout adapter comprise a combined RF and mechanical coupling.

12. The survey pole assembly of claim 1, wherein:

a main body of the survey pole is formed from a non-conductive material, and a conductive material is embedded in the main body of the survey pole to form the antenna.

13. A survey pole assembly, comprising:

a pole adapter configured to attach to a top end of a survey pole; and an antenna;

wherein the pole adapter comprises:

a top male mount configured to mechanically couple to a survey instrument;

a bottom antenna mount configured to hold the antenna within a hollow portion of the survey pole; and an antenna link comprising an upper Radio Frequency (RF) connector electrically coupled to a lower RF connector, wherein the upper RF connector is configured to electrically connect to a corresponding RF connector of the survey instrument, and the lower RF connector is configured to electrically connect to the antenna.

14. The survey pole assembly of claim 13, wherein:

the top male mount and the upper RF connector comprise a combined RF and mechanical coupling.

15. The survey pole assembly of claim 13, wherein the pole adapter further comprises:

an end coupler configured to engage the top end of the survey pole, the end coupler comprising:

a cylindrical body dimensioned to fit in the hollow portion of the survey pole; and a flange that projects radially from the cylindrical body, wherein an outer diameter of the flange is greater than an inner diameter of the survey pole;

wherein the top male mount projects axially from a top end of the cylindrical body.

16. The survey pole assembly of claim 15, wherein:

a threaded end of the lower RF connector projects axially from a bottom end of the end coupler, and defines the bottom antenna mount that holds the antenna upside down within the hollow portion.

17. The survey pole assembly of claim 13, further comprising:

a breakout adapter comprising:

a main body having a top male mount and a bottom female mount; and an antenna link extension;

wherein the bottom female mount is configured to mechanically couple to the top male mount of the pole adapter;

wherein the top male mount of the breakout adapter is configured to mechanically couple to the survey instrument;

wherein the antenna link extension is configured to electrically couple the survey instrument and the pole adapter.

18. The survey pole assembly of claim 17, wherein the antenna link extension comprises:

a side RF connector disposed through a side wall of the main body of the breakout adapter; and a bottom RF connector configured to electrically connect to the upper RF connector of the pole adapter.

19. The survey pole assembly of claim 18, wherein:

the bottom female mount and the bottom RF connector of the breakout adapter comprise a combined RF and mechanical coupling.

20. A method of assembling survey equipment, the method comprising:

acquiring a survey pole, a pole adapter, and an antenna, wherein the pole adapter comprises a top male mount configured to mechanically couple to a survey instrument, and an antenna link comprising an upper Radio Frequency (RF) connector electrically coupled to a lower RF connector;

electrically coupling the antenna to the lower RF connector of the pole adapter;

attaching the pole adapter to a top end of the survey pole, wherein the antenna is integrated in the survey pole;

mechanically mounting the survey instrument to the top male mount of the pole adapter; and electrically coupling the upper RF connector of the pole adapter to a corresponding RF connector of the survey instrument.

* * * * *